United States Patent
Chiong et al.

(10) Patent No.: US 11,150,786 B2
(45) Date of Patent: Oct. 19, 2021

(54) INFORMATION PROCESSING DEVICE, INFORMATION PROCESSING METHOD, PROGRAM AND STORAGE MEDIUM

(71) Applicant: Rakuten Group, Inc., Tokyo (JP)

(72) Inventors: Gianne Chiong, Tokyo (JP); Jonathan Sosa, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 16/643,148

(22) PCT Filed: Sep. 4, 2017

(86) PCT No.: PCT/JP2017/031801
§ 371 (c)(1),
(2) Date: Feb. 28, 2020

(87) PCT Pub. No.: WO2019/043948
PCT Pub. Date: Mar. 7, 2019

(65) Prior Publication Data
US 2020/0348808 A1    Nov. 5, 2020

(51) Int. Cl.
*G06F 3/0483* (2013.01)
*G06F 3/0485* (2013.01)
(Continued)

(52) U.S. Cl.
CPC .......... *G06F 3/0483* (2013.01); *G06F 3/0485* (2013.01); *G06F 3/04842* (2013.01); *G06F 3/04883* (2013.01)

(58) Field of Classification Search
CPC ............... G06F 3/0483; G06F 3/04842; G06F 3/0485; G06F 3/04883;
(Continued)

(56) References Cited

U.S. PATENT DOCUMENTS

| 8,935,620 | B1 * | 1/2015 | Cox | G06F 3/0483 715/760 |
| 2001/0024195 | A1 * | 9/2001 | Hayakawa | G06F 3/04847 345/173 |

(Continued)

FOREIGN PATENT DOCUMENTS

| JP | 2006-4409 A | 1/2006 |
| JP | 2009-140119 A | 6/2009 |

(Continued)

OTHER PUBLICATIONS

International Search Report for PCT/JP2017/031801 dated Oct. 24, 2017 [PCT/ISA/210].

*Primary Examiner* — Arpan P. Savla
*Assistant Examiner* — Linda Huynh
(74) *Attorney, Agent, or Firm* — Sughrue Mion, PLLC

(57) ABSTRACT

An information processing device detects a user's page feeding operation on content, determines a plurality of page feeding operations as a continuous operation if the page feeding operation has been performed again within a predetermined period from the page feeding operation, determines a page feeding operation not falling under the continuous operation as a one-shot operation, specifies first storage target page data according to the one-shot operation, makes a distribution request for page data not stored in the storage region among the specified first storage target page data, specifies second storage target page data according to a termination determination of the continuous operation, makes a distribution request for page data not stored in the storage region among the specified second storage target page data, stores page data distributed according to the distribution request in the storage region, and performs control for reading out and displaying the page data.

18 Claims, 19 Drawing Sheets

(51) Int. Cl.
*G06F 3/0484* (2013.01)
*G06F 3/0488* (2013.01)

(58) Field of Classification Search
CPC ..... G06F 16/957–9577; G06F 12/0808; G06F 12/0891
See application file for complete search history.

(56) References Cited

U.S. PATENT DOCUMENTS

| | | | | |
|---|---|---|---|---|
| 2008/0079972 | A1* | 4/2008 | Goodwin | G09G 5/346 358/1.12 |
| 2009/0106687 | A1* | 4/2009 | De Souza Sana | G06F 3/0481 715/784 |
| 2009/0288035 | A1* | 11/2009 | Tunning | G06F 16/9574 715/784 |
| 2010/0302283 | A1 | 12/2010 | Sasaki et al. | |
| 2011/0296334 | A1* | 12/2011 | Ryu | G06F 3/04883 715/776 |
| 2012/0084702 | A1* | 4/2012 | Lee | G06F 3/0483 715/776 |
| 2012/0147042 | A1* | 6/2012 | Shinomoto | G06T 11/60 345/633 |
| 2013/0145307 | A1* | 6/2013 | Kawasaki | G06F 3/0483 715/781 |
| 2014/0053066 | A1* | 2/2014 | Imamura | G06F 3/0485 715/251 |
| 2014/0380247 | A1* | 12/2014 | Tecarro | G06F 3/0482 715/863 |
| 2015/0261770 | A1* | 9/2015 | Chen | H04L 67/18 715/234 |
| 2017/0277343 | A1* | 9/2017 | Hotta | G06F 15/0291 |

FOREIGN PATENT DOCUMENTS

| | | |
|---|---|---|
| JP | 2010-117858 A | 5/2010 |
| JP | 2013-073453 A | 4/2013 |
| JP | 2014-056404 A | 3/2014 |

* cited by examiner

FIG. 4A

OPERATION HISTORY INFORMATION STORAGE AREA 17

| HISTORY | OPERATION DATE AND TIME | OPERATION TYPE | PAGE ADVANCING DIRECTION | GENRE | CONTENT ID |
|---|---|---|---|---|---|
| 001 | 2017. 6. 5. 7:00:00:00 | CONTINUOUS OPERATION | ADVANCING DIRECTION | COMIC | C001 |
| 002 | 2017. 6. 5. 7:00:00:30 | CONTINUOUS OPERATION | ADVANCING DIRECTION | COMIC | C001 |
| 003 | 2017. 6. 5. 7:01:12:00 | ONE-SHOT OPERATION | RETROGRESSING DIRECTION | COMIC | C001 |
| 004 | 2017. 6. 5. 7:02:11:00 | ONE-SHOT OPERATION | ADVANCING DIRECTION | COMIC | C001 |
| 005 | 2017. 6. 5. 7:05:12:00 | ONE-SHOT OPERATION | ADVANCING DIRECTION | PAPERBACK | C002 |
| ... | ... | ... | ... | ... | ... |

FIG. 4B

PAGE MANAGEMENT INFORMATION STORAGE AREA 18

| STORAGE DATE AND TIME | CONTENT ID | PAGE ID | ALREADY BROWSED? |
|---|---|---|---|
| 2017. 6. 5. 6:58:00:00 | C001 | PG1 | ☑ |
| 2017. 6. 5. 7:00:00:00 | C001 | PG3 | ☐ |
| 2017. 6. 5. 7:00:00:00 | C001 | PG4 | ☑ |
| 2017. 6. 5. 7:00:00:00 | C001 | PG5 | ☐ |
| ... | ... | ... | ... |

INFORMATION PROCESSING DEVICE, INFORMATION PROCESSING METHOD, PROGRAM AND STORAGE MEDIUM

CROSS REFERENCE TO RELATED APPLICATIONS

This application is a National Stage of International Application No. PCT/JP2017/031801 filed Sep. 4, 2017.

TECHNICAL FIELD

The present invention relates to an information processing device, an information processing method, a program, and a storage medium, and particularly relates to the technical field of content downloading.

BACKGROUND ART

In recent years, e-book download services have become widespread. In such an e-book download service, it is known that the browsing is performed according to, for example, a progressive download format in which page data of an e-book is download as needed and reproduced while being stored in a cache, in addition to a so-called full download format in which the browsing is performed in a state where all the page data of a purchased e-book is downloaded.

CITATION LIST

Patent Literature

Patent Literature 1: JP 2013-73453 A

SUMMARY OF INVENTION

Technical Problem

Patent Literature 1 discloses a content display device in which the display of a display unit is updated in such a manner that, in the display of an e-book, pages serving as page turning candidates can be stored by a first-type operation, and the pages of the page turning candidates stored by the first-type operation can be turned together at once by performing a second-type operation.

Here, according, to the progressive download format in which desired reading target pages of an e-book are downloaded one by one and reproduced while being stored in the cache, useless communications may be performed by requesting page information of pages that are less likely to be browsed by a user from a server.

In view of the above, the present invention intends to realize efficient e-book downloading according to a user operation.

Solution to Problem

An information processing device according to the present invention is an information processing device that requests only page data in a predetermined range including a page designated by a user's page feeding operation for each page feeding operation, including an operation type determination unit configured to detect a user's page feeding operation on content containing a plurality of pages, determine a plurality of page feeding operations as a continuous operation if the page feeding operation has been performed again within a predetermined period from the page feeding operation, and determine a page feeding operation not falling under the continuous operation as a one-shot operation, a page request unit configured to specify first storage target page data to be stored in a storage region according to the one-shot operation when a determination of the one-shot operation is made by the operation type determination unit, make a distribution request for page data not stored in the storage region among the specified first storage target page data, specify second storage target page data to be stored in the storage region according to a termination determination of the continuous operation when a determination of the continuous operation is made by the operation type determination unit, and make a distribution request for page data not stored in the storage region among the specified second storage target page data, a storage management unit configured to store page data distributed according to the distribution request in the storage region, and a display control unit configured to perform control for reading out page data from the storage region and displaying the readout page data in response to a user's page feeding operation.

That is, the operation type is automatically determined from the timing of the user's page feeding, operation, and the page data to be stored in the storage region is specified according to the operation type. Here, it is confirmed whether the specified page data is already stored in the storage region. For the page data not yet stored, page data request processing is performed on the assumption that the page data needs to be acquired. At this time, the page data to be stored in the storage region in response to the one-shot operation is specified as the first storage target page data, and the page data to be stored in the storage region in response to the continuous operation is specified as the second storage target page data.

Further, the page data of a transition destination page determined by the page feeding operation is read out from the storage region and displayed on a display unit.

Further, when the operation type is the continuous operation, the page data request processing according to the page feeding operation is not performed in a period in which it is determined that the continuous operation is being performed.

In the above-mentioned information processing device, it is considered that the page request unit specifies a display target page and a neighboring page of the display target page as the first storage target page data or the second storage target page data.

That is, in addition to the display target page to be displayed on the display device, the neighboring page that the user is likely to browse by the page feeding operation in the future is also specified as the page data for which a distribution request is to be made.

In the above-mentioned information processing device, it is considered that the page request unit specifies, as the display target page, an adjacent page of a currently displayed page among the first storage target page data, and specifies a page in a predetermined range including an adjacent page of the specified display target page as the neighboring page, and further specifies the display target page according to the continuous operation among the second storage target page data, and specifies a page in the predetermined range including the adjacent page of the specified display target page as the neighboring page.

As a result, when it is determined that the user's page feeding operation is the one-shot operation, the adjacent page of the currently displayed page is specified as the display target page. When it is determined that the user's page feeding operation is the continuous operation, the transition destination page specified by the continuous operation is set as the display target page. Then, the display target page corresponding to the operation type and the neighboring page being the page in the predetermined range including the adjacent page of the display target page are specified as the storage target page data.

In the above-mentioned information processing device, it is considered that the page request unit specifies, as the neighboring page, at least a page continuous in a page advancing direction from the display target page.

That is, a forward neighboring page neighboring in the page advancing direction when viewed from the display target page is stored in the storage region.

In the above-mentioned information processing device, it is considered that the neighboring pages are specified so that pages continuous in a page retrogressing direction, from the display target page are less than pages continuous in the page advancing direction from the display target page.

That is, when viewed from the display target page, not only neighboring pages in the page advancing direction hut also backward neighboring panes in the pane retrogressing direction are stored in the storage region, and the number of the forward neighboring pages to be stored is larger than the number of the backward neighboring pages to be stored.

In the above-mentioned information processing device, it is considered that the pane request unit specifies the neighboring page according to a capacity of the storage region.

That is, the number of the neighboring pages is set so that the storage region usable for another purpose of the information processing device can be secured.

In the above-mentioned information processing device, it is considered that the page request unit specifies the neighboring page according to a remaining amount of the storage region.

That is, the number of the neighboring panes is set so that the storage region of the page data can be secured.

In the above-mentioned information processing device, it is considered that the page request unit specifies the neighboring page based on an operation history of the user.

That is, the tendency of the user's operation is determined from the operation history, and the number of neighboring pages is changed according to the tendency of each user.

In the above-mentioned information processing device, it is considered that the page request unit specifies the neighboring page according to a time interval between the one-shot operations.

That is, the user's page turning speed is estimated from the interval between one-shot operations, and the number of neighboring pages is changed according to the user's page turning speed.

In the above-mentioned information processing device, it is considered that the operation type determination unit sets the predetermined period based on an operation history of the user.

That is, the tendency of the user's operation is determined from the operation history, and the criterion for determining the one-shot operation and the continuous operation is changed for each user.

In the above-mentioned information processing device, it is considered that the operation type determination unit sets the predetermined period based on an operation history of the user in currently displayed content.

As a result, the tendency of the user's operation is grasped for each content, and the criterion for determining the one-shot operation and the continuous operation is changed for each content.

In the above-mentioned information processing device, it is considered that the operation type determination unit sets the predetermined period based on type information of the currently displayed content.

As a result, the criterion for determining the one-shot operation and the continuous operation is changed for each content being browsed by the user.

In the above-mentioned information processing device, it is considered that the storage management unit deletes a whole or a part of page data not falling under a predetermined range including an adjacent page of a currently displayed page among the page data stored in the storage region.

That is, the page data not falling under the predetermined range including the adjacent page of the currently displayed page is deleted as needed, and a free space is secured in the storage region.

In the above-mentioned information processing device, it is considered that the storage management unit deletes page data that is outside the predetermined range and oldest in timing of storage, among the page data stored in the storage region.

As a result, page data that is less likely to be browsed by the user in the suture is deleted.

In the above-mentioned information processing device, it is considered that the storage management unit deletes page data that is outside the predetermined range and has been a display target at least once, among the page data stored in the storage region.

That is, since the page having been browsed at least once by the user is unlikely to be browsed by the user, the page data is deleted.

In the above-mentioned information processing device, it is considered that the storage management unit deletes page data that is outside the predetermined range and is furthest in a page retrogressing direction from page data serving as a display target, among the page data stored in the storage region.

That is, the page feeding operation in the page retrogressing, direction from the display target page being displayed is not so frequently performed. This is even more so in the case of a backward neighboring page that is furthest from the display target page. Therefore, this backward neighboring page is deleted.

In the above-mentioned information processing device, it is considered that the display control unit, when detecting a page feeding operation, displays a page obtained by simplifying a page constituting the currently displayed content, as a page transition screen showing a state of page transition.

As a result, the page transition screen stored according to the genre of the content is displayed until the transition destination page is displayed.

An information processing method according to the present invention is an information processing method that is executed by an information processing device that requests only page data in a predetermined range including a page designated by a user's page feeding operation for each page feeding operation, including steps of detecting a user's page feeding operation on content containing a plurality of pages, determining a plurality of page feeding, operations as a continuous operation if the page feeding operation has been performed again within a predetermined period from the page feeding operation, and determining a page feeding operation not falling under the continuous operation as a one-shot operation, specifying first storage target page data to be stored in a storage region according to the one-shot operation when a determination of the one-shot operation is made, making a distribution request for page data not stored in the storage region among the specified first storage target page data, specifying second storage target page data to be stored in the storage region according to a termination determination of the continuous operation when a determination of the continuous operation is made, and making a distribution request for page data not stored in the storage region among the specified second storage target page data, storing page data distributed according to the distribution request in the storage region, and performing control for reading out page data from the storage region and displaying the readout page data in response to a user's page feeding operation.

A program according to the present invention is a program that causes an information processing device to execute each processing of the above information processing method.

A storage medium according to the present invention is a storage medium that stores the above program.

The program and the storage medium can realize the above information processing device.

Advantageous Effects of Invention

According to the present invention, it is possible to reduce the amount of communications between a user terminal used for content browsing and a web server, and to effectively use a storage region of the user terminal.

BRIEF DESCRIPTION OF DRAWINGS

FIGS. 4A and 4B are explanatory diagrams illustrating a database according to an embodiment.

DESCRIPTION OF EMBODIMENTS

Hereinafter, embodiments will be described in the following order.

<1. Overall Configuration>
<2. Functional Configuration of User Terminal>
<3. First Embodiment>
<4. Second Embodiment>
<5. Third Embodiment>
<6. Fourth Embodiment>
<7. Fifth Embodiment>
<8. Sixth Embodiment>
<9. Seventh Embodiment>
<10. Eighth Embodiment>
<11. Ninth Embodiment>
<12. Conclusion>
<13. Program and Storage Medium>

The meaning of respective terms used below are as follows.

The page feeding operation refers to an operation by a user for turning the page of an e-book in a page advancing direction or a direction opposite to the advancing direction. For example, a user performs the page feeding operation by an operation such as a flick input or a touch operation.

The one-shot operation refers to a page feeding operation when the page feeding operation has not been performed again within a predetermined period from the page feeding operation. The user, by performing the one-shot operation, can browse a page adjacent to a page currently displayed on a display screen.

The continuous operation refers to a plurality of page feeding operations when the page feeding operation has been performed again within a predetermined period from the page feeding operation. The user, by performing the continuous operation, can browse a page apart from the currently displayed page.

The display target page refers to a page specified by a user's page feeding operation, and is a page to be displayed (serving as a display target) in processing.

Forward refers to the page advancing direction when viewed from the display target page.

Backward refers to the page retrogressing direction when viewed from the display target Page.

The adjacent page refers to a page adjacent to the front or rear of the display target page, and a neighboring page is a page neighboring within a predetermined range from the display target page (including the adjacent page). Further, forward neighboring pages refer to a predetermined number of pages in the page advancing direction (forward) from the display target page, and backward neighboring pages refer to a predetermined number of pages in the page retrogressing direction (backward) from the display target page.

Further, a user terminal that receives page data from a web server that provides an e-book download service (hereinafter, referred to as the present service) and displays the received page data will be described as an exemplary information processing device according to the claims of the present invention.

1. Overall Configuration

Figure 1:
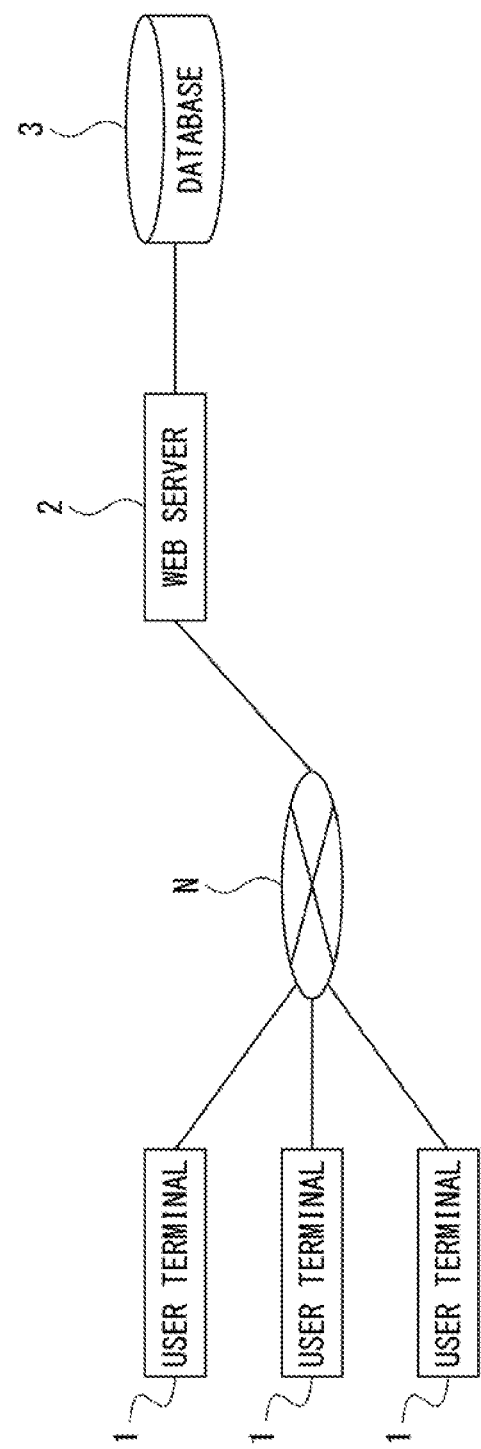
FIG. 1 is an explanatory diagram illustrating an exemplary configuration of a network system according to an embodiment.

FIG. 1 illustrates an exemplary configuration of a network system according to the present embodiment. The network system is configured such that a user terminal 1 and a web server 2 can communicate with each other via a network N.

Further, the web server 2 can access a database 3 (hereinafter, the "database" is referred to as "DB").

There are various examples that are conceivable as this type of system. In the present embodiment, the network system is configured an e-book download system that allows users to freely download and browse e-books, for example, by downloading e-books such as magazines and novels purchased on sites separately on an application and browsing them, or by paying a subscription fee every month or the like. For example, the user terminal 1 illustrated in FIG. 1 corresponds to an embodiment of the information processing device in the claims of the present invention. Users can browse, via the user terminal 1, e-books such as magazines downloaded from the web server 2.

The configuration assumed for the network N includes various examples. For example, the Internet, intranet, extranet, LAN (Local Area Network), CATV (Community Antenna TeleVision), communication network, virtual private network (Virtual Private Network), telephone network, mobile communication network, and satellite communication network are assumed.

Further, transmission media assumed to constitute the whole or a part of the network N includes various examples. For example, as usable transmission media, examples of wired type include IEEE (Institute of Electrical and Electronics Engineers) 1394, USB (Universal Serial Bus), power-line carrier, and telephone line, and examples of wireless type include infrared light such as IrDA (Infrared Data Association), Blue tooth (registered trademark), 802.11 Wireless, portable telephone network, satellite channel, and digital terrestrial network.

The user terminal 1 is a terminal device used by each user who uses the present service provided by the web server 2, and is, for example, a PC (Personal Computer), a feature phone, a PDA (Personal Digital Assistant) having a communication function, or a smart device such as a smartphone or a tablet terminal.

The user, using the user terminal 1, can perform various operations including an operation for downloading an e-book such as a magazine or a novel and an operation for browsing the downloaded e-book, in the present service provided by the web server 2.

The web server 2 performs, in response to a request from the user terminal 1, login processing and transmission of downloadable e-book page data. The DB 3 stores various information of e-books to be presented.

Examples of the e-books to be presented include various types, such as "paperback", "magazine", "mook", and "comic".

The web server 2, in response to various requests from the user terminal 1, acquires necessary information from the DB 3, and transmits the acquired information to the user terminal 1 via the network N.

Figure 2:
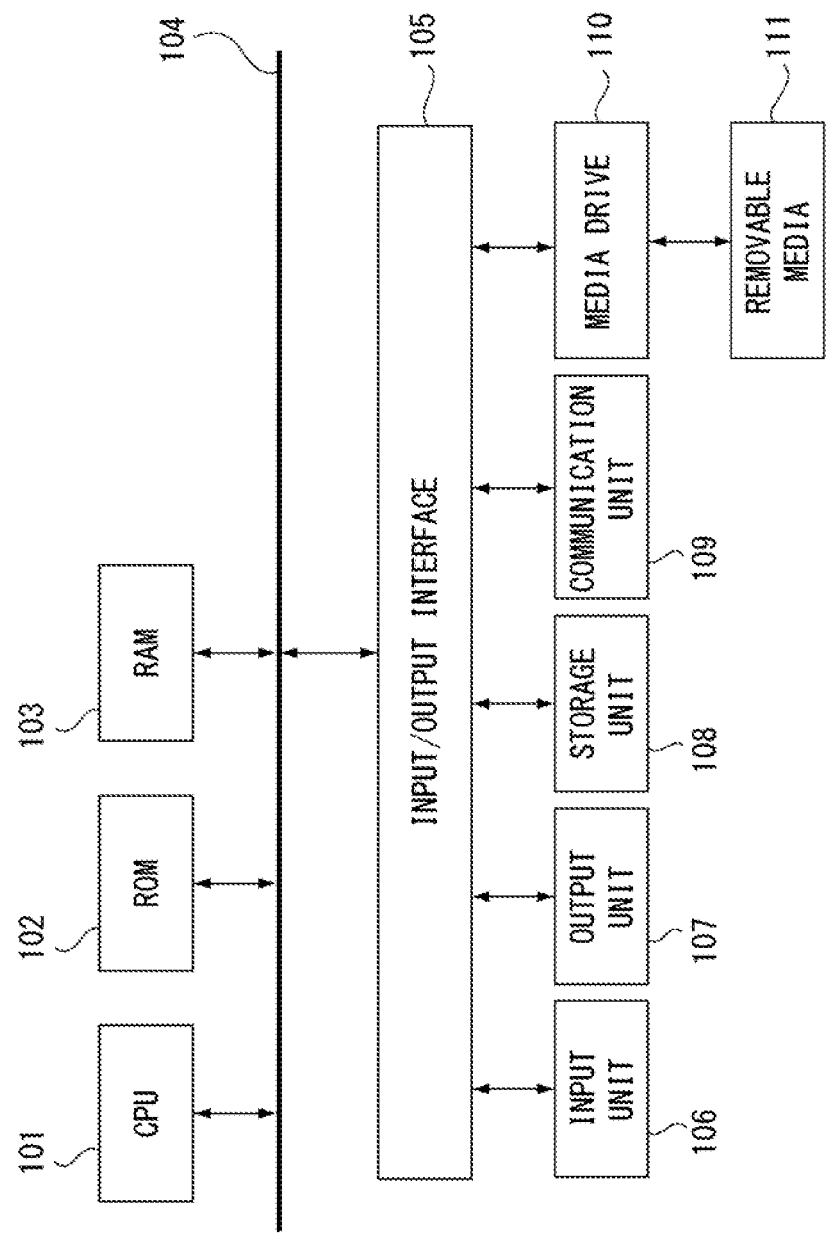
FIG. 2 is an explanatory diagram illustrating a hardware configuration according to an embodiment.

FIG. 2 illustrates a hardware configuration of the information processing device that constitutes the user terminal 1 or the web server 2. Each device such as the user terminal 1 or the web server 2 can be realized as a computer device illustrated in FIG. 2 that can perform information processing and information communication.

In FIG. 2, a CPU (Central Processing Unit) 101 of the computer device executes various processing according to programs stored in a ROM (Read Only Memory) 102 or programs loaded from a storage unit 108 to a RAM (Random Access Memory) 103. Further, data required for the CPU 101 to execute various processing is appropriately stored in the RAM 103.

The CPU 101, the ROM 102, and the RAM 103 are mutually connected via a bus 104. An input/output interface 105 is also connected to the bus 104.

An input unit 106 including a keyboard, a mouse, a touch panel, and the like; an output unit 107 including a display device, such as an LCD (Liquid Crystal Display), a CRT (Cathode Ray Tube), and an organic EL (Electroluminescence) panel, a speaker, or the like; the storage unit 108 constituted by an HDD (Hard Disk Drive), a flash memory device, or the like, and a communication unit 109 that performs communication processing and inter-device communication via the network N are connected to the input/output interface 105.

Further, when necessary, a media drive 110 is connected to the input/output interface 105. A removable media 111 such as a magnetic disk, an optical disk, a magneto-optical disk, or a semiconductor memory can be appropriately loaded on media drive 110, and information is written to and read from the removable media 111.

In such a computer device, data and programs can be uploaded and downloaded by communications performed by the communication unit 109, and data and programs can be transferred via the removable media 1113.

The CPU 101, by performing processing operations based on various programs, enables the user terminal 1 and the web server 2 to execute necessary information processing and communications.

The information processing device constituting the user terminal 1 and the web server 2 is not limited to a single computer device as illustrated in FIG. 2, and may be configured by a system including a plurality of computer devices. The plurality of computer devices ma be systemized via a LAN or the like, or may be arranged in a communicable state at a remote location by a VPN using the Internet or the like. The plurality of information processing devices may include an information processing device as a server group (cloud) that can be used in a cloud computing service.

2. Functional Configuration of User Terminal

Figure 3:
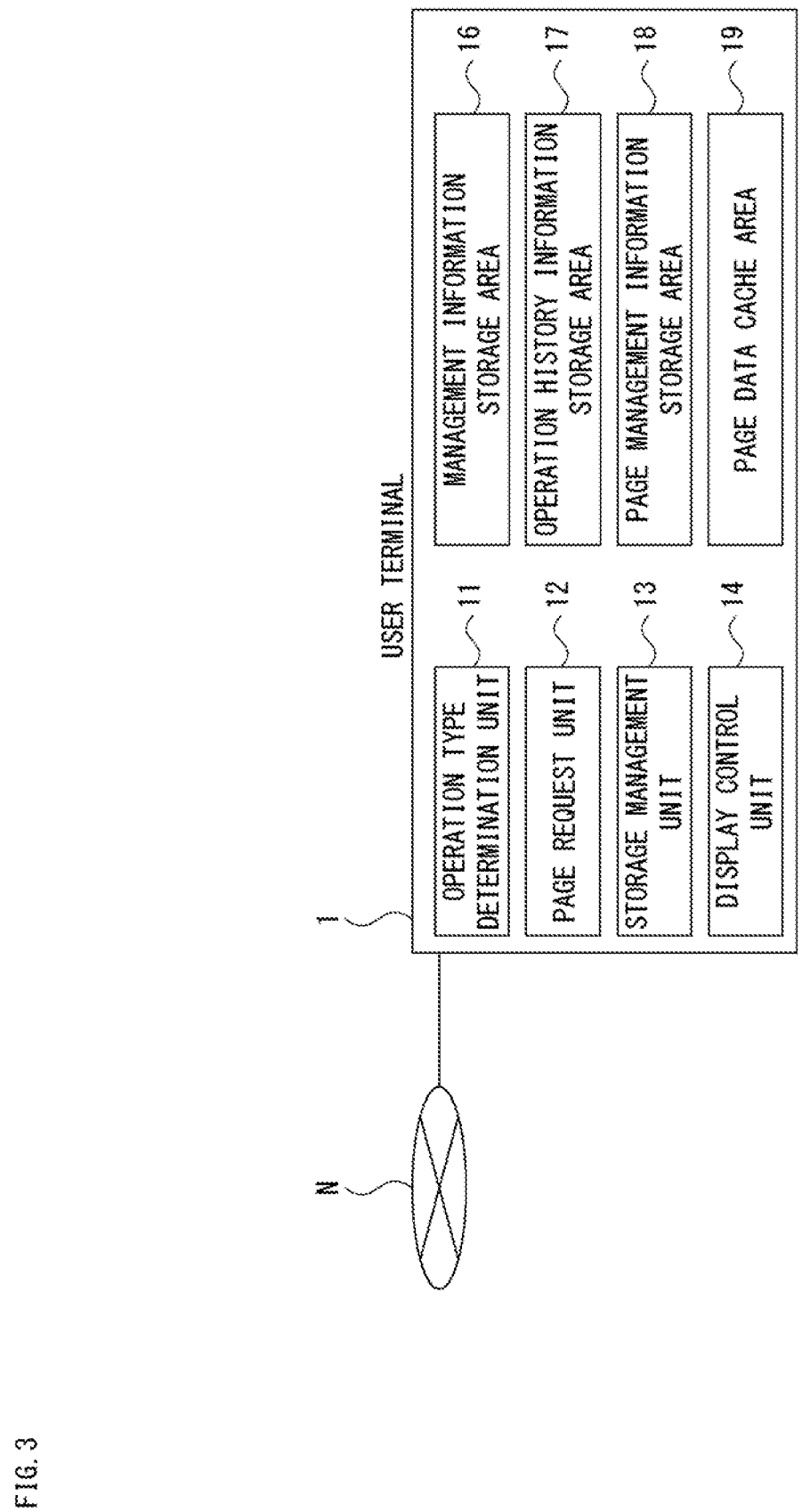
FIG. 3 is an explanatory diagram illustrating a web server and a database according to an embodiment.

FIG. 3 illustrates an exemplary functional configuration of the user terminal 1. The user terminal 1 is constituted by one or more information processing devices.

Further, each function of the user terminal 1 is a function that can be realized by processing executed by the CPU 101 according to a program in the information processing device. However, the whole or a part of processing by each configuration described below may be realized by hardware.

Further, when each function is realized by software, it is unnecessary to realize each function by an independent program. Processing of a plurality of functions may be executed by one program, and one function may be realized by cooperation of a plurality of program modules. Further, each function may be realized in a distributed manner by a plurality of information processing devices. Moreover, one of the functions may be realized by a plurality of information processing devices.

The user terminal 1 includes an operation type determination unit 11, a page request unit 12, a storage management unit 13, and a display control unit 14.

The operation type determination unit 11 detects a user's page feeding operation on content containing a plurality of pages, determines a plurality of page feeding operations as a continuous operation if the page feeding operation has been performed again within a predetermined period from the page feeding operation, and determines a page feeding operation not falling under the continuous operation as a one-shot operation.

Further, the operation type determination unit 1 sets the predetermined period based on an operation history of the user. In particular, the operation type determination unit 11 sets the predetermined period based on the operation history of the user in the content. In addition, the operation type determination unit 11 can set the predetermined period based on content type information.

The page request unit 12, when a determination of the one-shot operation is made by the operation type determination unit 11, specifies first storage target page data to be stored in a storage region according to the one-shot operation, and during a period in which the operation type determination unit 11 determines that the continuous operation is being performed, does not request distribution of page data according to the page feeding operation, and further when termination of the continuous operation is determined, specifies second storage target page data to be stored in storage region according to the continuous operation.

Further, the page request unit 12 requests the web server 2 to distribute page data that is not stored in the storage region, among specified first storage target page data or second storage target page data.

The page data to be requested to the web server 2 includes, as described below, a display target page to be displayed on the display device of the user terminal 1 by the display control unit 14, forward neighboring pages being data representing a predetermined number of pages continuous in the page advancing direction from the display target page, and backward neighboring pages being data representing a predetermined number of pages continuous in the page retrogressing direction from the display target page.

The storage management unit 13, in response to a request, stores the page data distributed from the web server 2 in the storage region.

Further, the storage management unit 13 deletes some page data other than the page data acquired by the page request unit 12, from the page data stored in the storage region.

The display control unit 14, in response to a user's page feeding operation, performs control to read out page data from the storage region and display the readout page data.

Further, the display control unit 14, when detecting a page feeding operation, displays a page obtainable by simplifying the page of currently displayed content as a page transition screen showing the state of page transition.

The display control unit 14 also controls the display of various other screens on the user terminal 1.

Hereinafter, storage regions that can be used by the user terminal 1 having the above-mentioned functions to perform various processing, such as calculation of the predetermined period, determination of the display target page and neighboring pages requiring a page data distribution request to the web server 2, and deletion of stored page data, will be described. For example, when the user terminal 1 is configured by the computer device illustrated in FIG. 2, the RAM 103 and the storage unit 108 can be used to prepare the following storage regions.

For example, a management information storage area 16, an operation history information storage area 17, a page management information storage area 18, and a page data cache area 19 are prepared as storage regions. Needless to say, another information storage region required to function as the user terminal 1 for using the e-book download system in the present service may be prepared.

The management information storage area 16 stores management information of an e-book selected by the user. The management information includes file size information of the e-book selected by the user, page information including information for enabling a page-basis distribution request (for example, offset and page data size of each page), another metadata relating to the e-book, and the like.

The management information storage area 16 is updated each time the management information of the e-book selected by the user is received from the web server 2.

The operation history information storage area 17 stores data relating to an operation history of the user. For example, as illustrated in FIG. 4A, the operation history information is stored by associating operation date and time, operation type, page advancing direction in page feeding operation, genre and ID of content with a history ID being identification information of the operation history.

The operation history information storage area 17 is updated, for example, each time the user terminal 1 detects a user's page feeding operation.

The page management information storage area 18 stores page management information on the page data stored in the page data cache area 19. In the page management information area 18, for example, as illustrated in FIG. 4B, the content ID being content identification information is stored in association with page data storage date and time, page ID being page data identification information, and page data browsing state.

The page management information storage area 18 is updated each time the page data received from the web server 2 is stored in the page data cache area 19. Further, the page management information storage area 18 is updated when the page data stored in the storage region is deleted.

The page data cache area 19 stores page data of an e-book received from the web server 2. The page data is data on a book page to be actually displayed. Various modes are conceivable as an image presentation mode. Examples thereof include a fix type in which a paper medium is scanned to create an image format e-book, and a reflow type in which an image is presented based on text data.

The fix type is used for digitization of books mainly composed of images such as cartoon works and a collection of photographs, and is suitable for practical books and business books having a complicated layout in which numerous tables and illustrations are arranged. Further, because of the use of text data, the reflow type can easily perform the scaling of graphic characters (fonts) or the change of the space between lines, and is advantageous in that characters can be presented in a form that is easy to read for users even when a device has a smaller screen size.

The page data cache area 19 stores page data in association with, for example, the page ID.

These storage regions, although they are prepared in the user terminal 1 and specifically prepared in, for example, the storage medium such as the RAM 103 and the storage unit 108 illustrated in FIG. 2, may be realized in any form as long as the user terminal 1 can access the operation history information storage area 17 and the page management information storage area 18. For example, the operation history information storage area 17 and the page management information storage area 18 may be formed in a storage unit in the same system as the user terminal 1, or the whole or a part of the operation history information storage area 17 and the page management information storage area 18 may be provided in a computer system provided separately or at a remote location.

Needless to say, each of the illustrated storage regions needs not be formed in a single device (for example, one HDD). For example, the storage of information stored in the storage region may be managed by a plurality of storage regions. The above storage region as described in the embodiment is merely an exemplary form of the storage unit configured to store information related to processing in the embodiment. Further, it is unnecessary to configure each of the management information storage area 16, the operation history information storage area 17, the page management information storage area 18, the page data cache area 19, and the like formed in the storage region as one area.

Further, the operation history information storage area 17 and the page management information storage area 18 may be constructed in a server computer different from the user terminal 1, for example, in the web server 2.

3. First Embodiment

The outline of a sequential flow of page feeding operations on content displayed on the user terminal 1, in an e-book download service according to a first embodiment, will be described with reference to FIGS. 5A through 8C.

The first embodiment will be described using a smart device 70 having a display unit 71 illustrated in FIG. 5A as an example of the user terminal 1 operated by a user.

The user, via a touch panel provided on the display unit 71, can perform tap, double-tap, flick, swipe, pinch-in, pinch-out, shake, and scrub operations and the like, in order to perform various operations such as selection of an e-book to be browsed, page feeding of the selected e-book, termination of browsing of the e-book, and the like.

Figure 5A:
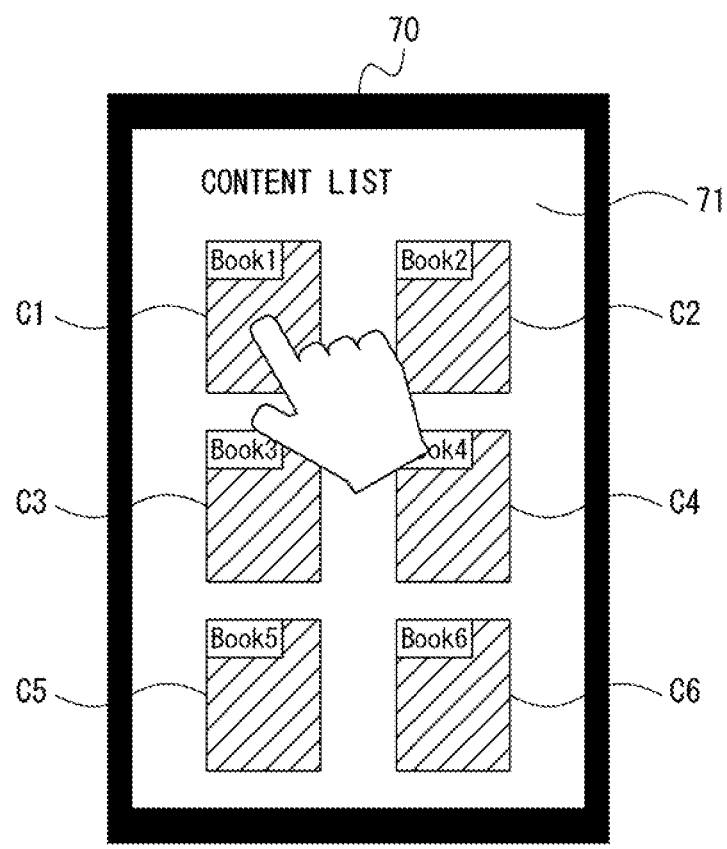
FIGS. 5A and 5B are explanatory diagrams illustrating a content selection screen according to a first embodiment.

When the user uses the e-book download service, first, as illustrated in FIG. 5A, a list of browsable e-books is displayed on the display unit 71. FIG. 5A illustrates, as an example, e-books C1 to C6 displayed on the display unit 71. The user can perform a flick operation or the like to display a list of browsable e-books other than the e-books C1 to C6.

The user selects, by a tap operation, a desired e-book as a browsing object, from the displayed e-books C1 to C6. FIG. 5A illustrates an example in which the user selects the e-book C1. Further, the selected e-book C1 is a comic magazine C1 having a plurality of frame layouts.

Figure 5B:
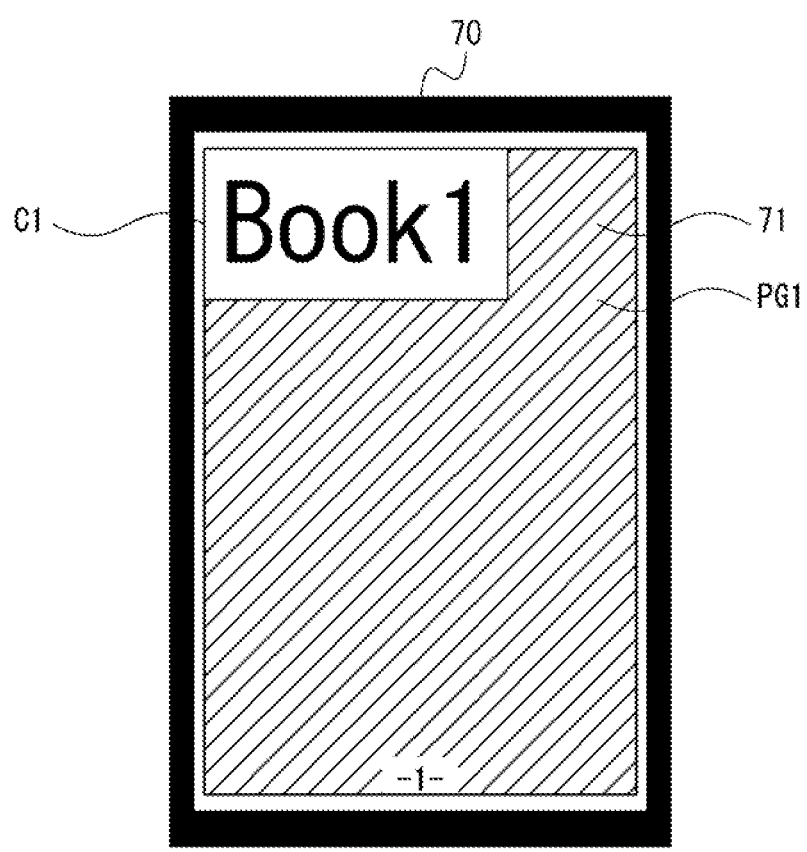

When the comic magazine C1 is selected by the user, as illustrated in FIG. 5B, a first page PG1 that is a title screen of the comic magazine C1 is displayed on the display unit 71. Thus, the selected e-book is brought into a state where it can be read by the user.

Hereinafter, the page feeding operations performed by the user when reading the comic magazine C1 will be described with reference to FIGS. 6A through 8C.

The page feeding operation is an operation for turning the page of the e-book in the page advancing direction or in a direction opposite to the advancing direction. For example, the user terminal 1 detects a user's flick operation as the page feeding operation. In the present embodiment, the page feeding operations are classified into the one-shot operation or the continuous operation.

Although the page feeding operation is exemplified as the flick operation in the present embodiment, the page feeding operation can be any one of various operations such as tapping, shaking, and long pressing of the touch panel.

The one-shot operation refers to an operation for turning the page from the page currently displayed on the display unit 71 to an adjacent page. For example, the user flicks the display unit 71 once to perform the one-shot operation.

Figure 6A:
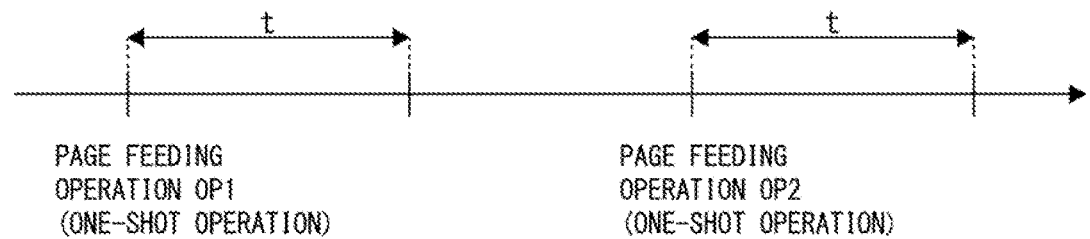
FIGS. 6A and 6B are explanatory diagrams illustrating page feeding operation types according to the first embodiment.

Specifically, as illustrated in FIG. 6A, if a next page feeding operation OP2 has not been performed within a predetermined period (hereinafter, referred to as operation determination period t) from the performance of a page feeding operation OP1 the page feeding operation OP1 is regarded as a one-shot operation. The operation determination period t is set to an appropriate time such as 0.3 seconds, 0.5 seconds, or 1 seconds, for distinguishing from the continuous operation described below.

Similarly, the page feeding operation OP2, if a next page feeding operation has not been performed within the operation determination period t, is determined as being a one-shot operation.

Figure 7A:
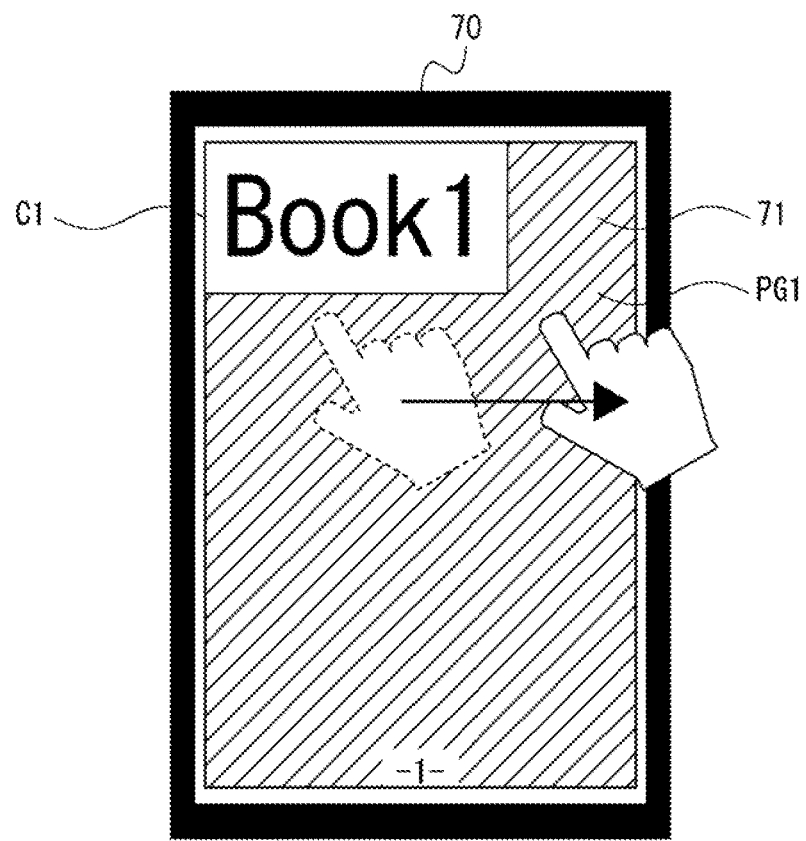
FIGS. 7A and 7B are explanatory diagrams illustrating a one-shot operation according to the first embodiment.
Figure 7B:
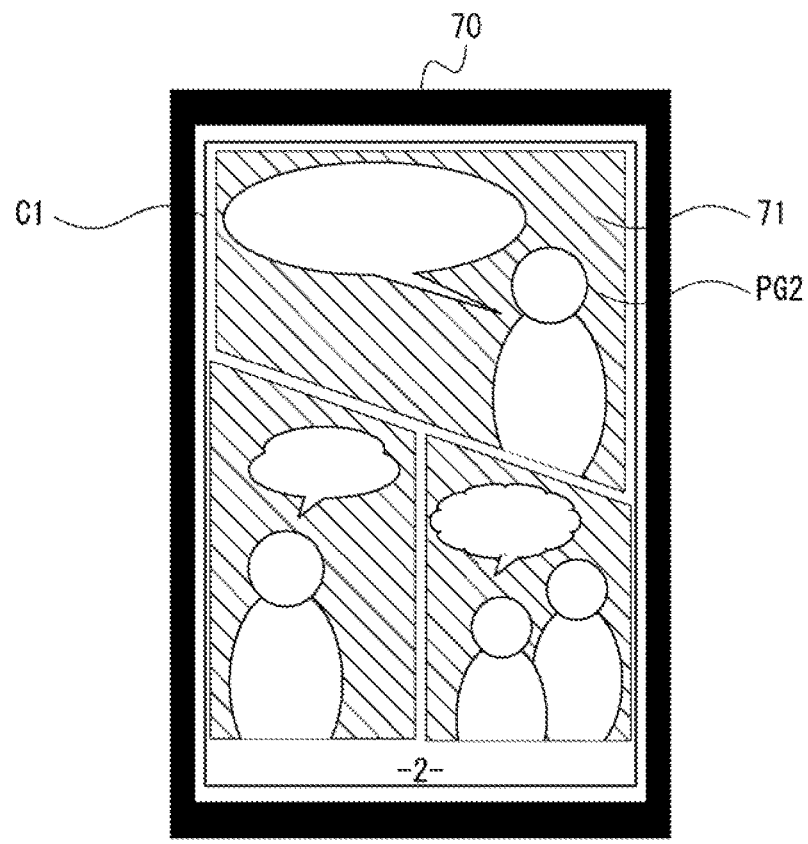

According to an example illustrated in FIG. 7A, the first page PG1 of the selected comic magazine C1 is displayed on the display unit 71. Here, when the user performs the flick operation (the page feeding operation OP1) once on the display unit 71, this operation is determined as being a one-shot operation. Upon this operation, as illustrated in FIG. 7B, the page PG2 that is the page next to the first page PG1 is displayed on the display unit 71.

In this embodiment, the flick toward the right (rightward flick) illustrated in FIG. 7A is regarded as a page-advancing-direction (forward) page feeding operation. In this case, the flick toward the left (left flick) is regarded as a page-returning-direction (backward) page feeding operation. Needless to say, this operation method may be reversed.

On the other hand, the continuous operation refers to an operation for turning the page to a page apart from the page currently displayed on the display unit 71. For example, the user performs a plurality of flick operations in a short period of time for a continuous operation.

Figure 6B:
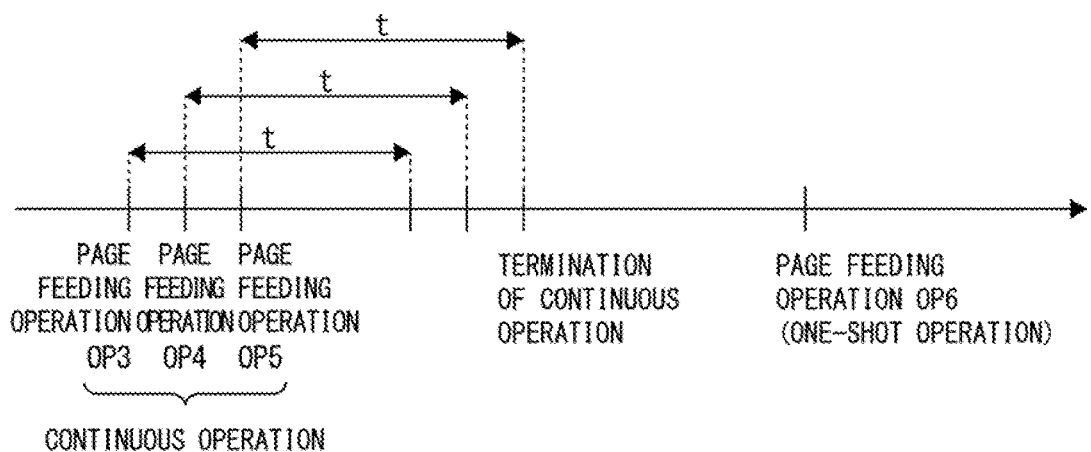

Specifically, as illustrated in FIG. 6B, if a next page feeding operation OP4 is performed before the operation determination period t elapses from the performance of a page feeding operation OP3, the operations OP3 and OP4 are regarded as a continuous operation. Further, a page feeding operation OP5, which has been performed before the operation determination period t elapses from the page feeding operation OP4 is determined as being a continuous operation. That is, in the example illustrated in FIGS. 6A and 6B, sequential operations OP3 to OP5 are regarded as a continuous operation.

When the operation determination period t elapses from the latest page feeding operation, the continuous operation is regarded as being terminated. At this time, the user terminal 1 performs processing for calculating the number of page feeding operations having been performed until termination of the continuous operation and causing the display unit 71 to display a page advanced by the calculated number of times from the currently displayed page.

The example in FIG. 6B indicates that the operation determination period t has elapsed after the page feeding operation OP5. Therefore, three page feeding operations OP3 to OP5 are determined as being a continuous operation. As a result, a page that is three pages ahead of the page currently displayed on the display unit 71 is displayed.

If a page feeding operation OP6 is performed after the operation determination period t has elapsed since the latest page feeding operation OP5, similar determination between the one-shot operation and the continuous operation is performed by checking whether or not the page feeding operation has been performed again within the operation determination period t from the page feeding operation OP6.

Figure 8A:
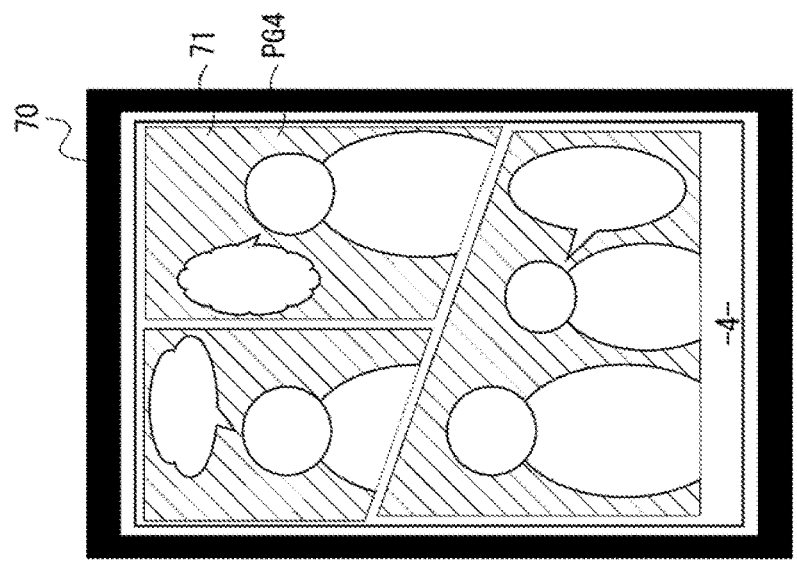
FIGS. 8A-8C are explanatory diagrams illustrating a continuous operation according to the first embodiment.
Figure 8B:
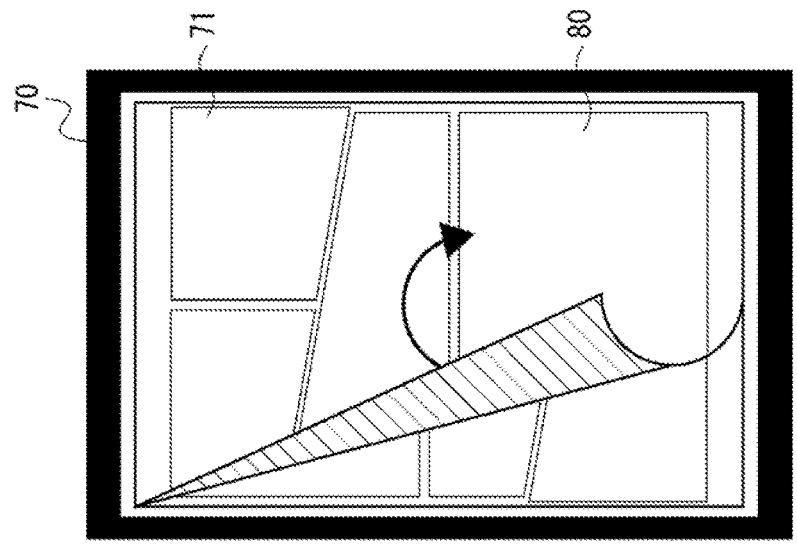
Figure 8C:
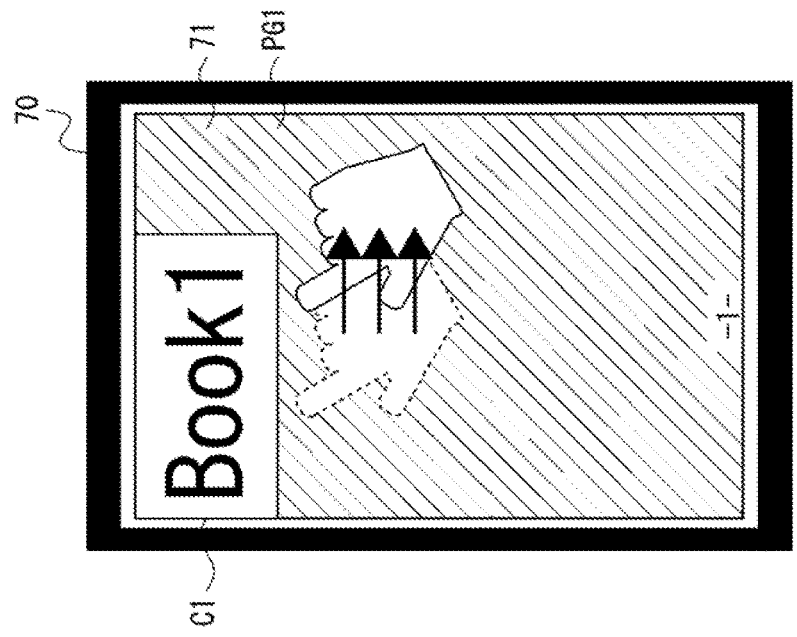

An example in FIG. 8A illustrates that the user has performed three flick operations (page feeding operations OP3 to OP5) within a short period of time on the display unit 71 that displays the first page PG1. When such a continuous operation is performed, a page transition screen 80 that is prepared in advance to give a natural page feeding, impression to the user and leaves only blank comic frames is displayed on the display unit 71. Subsequently, as illustrated in FIG. 8C, the page PG4 that is three pages ahead of the first page PG1 is displayed on the display unit 71.

The above continuous operation is applicable when operations are performed in the same, forward or backward, direction. For example, when a rightward flick and a leftward flick are continuous within the operation determination period t, each can be recognized as a one-shot operation.

As described above, by intentionally selecting the one-shot operation or the continuous operation when performing page feeding operations, the user can enjoy comfortable page browsing.

Although not illustrated, operation buttons necessary to exert various functions, such as termination of each processing, may be separately provided.

Hereinafter, page feeding processing on the comic magazine C1 that can be performed by using the user terminal 1 will be described with reference to FIGS. 9 through 12.

In the following description, the processing of the user terminal 1 can be executed by cooperation of respective functions of at least the operation type determination unit 11, the page request unit 12, the storage management unit 13, and the display control unit 14 illustrated in FIG. 3.

Figure 9:
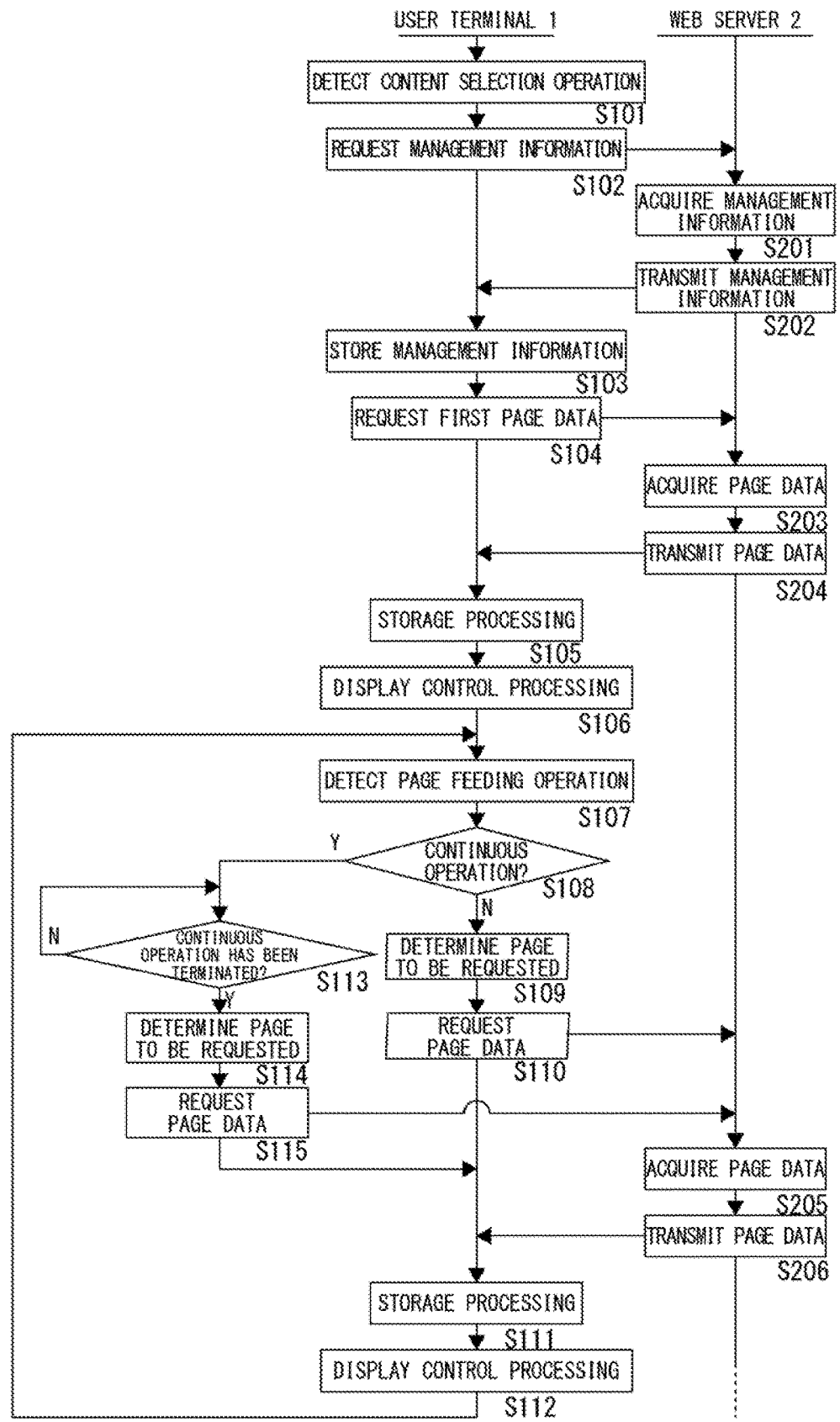
FIG. 9 is an explanatory diagram illustrating the flow of processing to be performed by a user terminal and the web server according to the first embodiment.

First, with reference to FIG. 9, the outline of page transition processing for the comic magazine C1, which is content selected by the user in the present service by using, the user terminal 1 for page feeding operation, will be described. In this example, page data of the content is not yet download.

Although not illustrated in the drawings, each user who demands the present service in the e-book download system accesses, in advance, a website provided by the web server 2, via the user terminal 1, and performs a login operation. The user terminal 1 transmits a login request to the web server 2. The web server 2, having received the login request, authenticates a user ID and a password for login processing.

The web server 2, upon completion of the login processing, specifies the user as a processing target.

After the login processing has been performed in the web server 2, if the user terminal 1 detects a user's content selection operation in step S101, then in step S102, the user terminal 1 performs processing for requesting management information from the web server 2.

The web server 2, when acquiring the management information request from the user terminal 1, acquires management information from the DB 3 in step S201, and subsequently transmits the acquired management information to the user terminal 1 in step S202.

The user terminal 1, having received the management information from the web server 2, stores the management information in the management information storage area 16 illustrated in FIG. 3, in step S103. This brings the user terminal 1 into a state where it can request arbitrary page data of the comic magazine C1, based on the stored management information.

First, in step S104, the user terminal 1 transmits, to the web server 2, a request for page data with respect to the first page PG1 of the selected comic magazine C1. The web server 2, upon receiving the request for page data from the user terminal 1, acquires page data of the first page PG1 from the DB 3 in step S203 and transmits the acquired page data to the user terminal 1 in step S204.

The user terminal 1, upon receiving the page data of the first page PG1 from the web server 2, stores the page data in the page data cache area 19 illustrated in FIG. 3 in step S105 and controls the display unit 71 to display the page data in step S106 In this manner, by storing the page data in the page data cache area 19, the user terminal 1 can acquire the page data from the page data cache area 19 without requesting the page data from the web server 2, when displaying the once stored page on the display unit 71 again. This eliminates the need to communicate with the web server 2 again, and can reduce the amount of communications.

In a state where the page of the selected comic magazine C1 is displayed on the display unit 71, the user terminal 1 monitors in step S107 whether or not a page feeding operation by a user's flick operation or the like has been performed. When the user terminal 1 detects the page feeding operation in step S107, the processing proceeds to step S108 to determine whether the detected page feeding operation is a one-shot operation or a continuous operation.

If the next page feeding operation has not been performed within the operation determination period t from the page feeding operation detected in step S107, then in step S108, the user terminal 1 determines that the page feeding operation detected in step S107 is a one-shot operation. Then, the processing proceeds to step S109 in which the user terminal 1 determines, as a page whose distribution is to be requested, page data next to the page displayed most recently in the display region of the display unit 71. Subsequently, in step S110, the user terminal 1 performs processing for transmitting a distribution request for the determined page data to the web server 2.

The web server 2, upon receiving the page data distribution request from the user terminal 1, acquires the requested page data from the DB 3 in step S205, and transmits the acquired page data to the user terminal 1 in step S206.

The user terminal, upon receiving the page data from the web server 2, stores the page data in the page data cache area 19 in step S111. Temporal storage of the page data in the page data cache area 19 makes it unnecessary to request a page from the web server 2 when the display unit 71 is caused to display the same page data on the display region thereof again.

Then, the processing proceeds to step S112 in which the user terminal 1 causes the display unit 71 to display a page next to the page displayed most recently on the display region thereof.

Subsequently, the user terminal 1 completes the processing by the one-shot operation.

Then, the processing returns to step S107 to monitor the presence of any page feeding operation again.

If the next page feeding operation has been performed within the operation determination period t from the page feeding operation detected in step S107, then in step S108, the user terminal 1 determines that the page feeding operation detected in step S107 is a continuous operation. Subsequently, the processing proceeds to step S113. In step S113, the user terminal 1 determines whether the continuous operation has been terminated. In this embodiment, when the operation determination period t has elapsed since the latest page feeding operation, it is determined that the continuous operation has terminated.

If the termination of the continuous operation is determined in step S113, then in step S114, the user terminal 1 determines page data whose distribution is to be requested from the web server 2 according, to the number of times of the continuous operation and the storage status of page data in the page data cache area 19.

Subsequently, in step S115, the user terminal 1 performs processing for transmitting the page data distribution request determined in step S114 to the web server 2.

The web server 2, upon receiving the page data distribution request transmitted from the user terminal 1 in step S115, performs processing for acquiring the requested page data from the DB 3 in step S205 and transmitting the acquired page data to the user terminal 1 in step S206.

The user terminal 1, upon receiving the page data from the web server 2, stores the page data in the page data cache area 19 in step S111.

Then, the processing proceeds to step S112 in which the user terminal 1 causes the display unit 71 to display a page of a transition destination according to the page feeding operation.

Subsequently, the user terminal 1 completes the processing by the continuous operation. Then, the processing returns to step S107 to monitor the presence of any page feeding operation again.

According to the above-described processing, the user terminal 1 determines whether the user's page feeding operation is a one-shot operation or a continuous operation, and then, requests page from the web server 2. Thus, it becomes unnecessary to make a page data distribution request for pages that are skipped by a continuous operation and are less likely to be browsed by the user. As a result, the user terminal 1 can reduce the amount of communications with the web server 2. Further, in the user terminal 1, the amount of page data stored in the storage region can be reduced.

Processing that the user terminal 1 performs to realize the above-mentioned page feeding operations will be described with reference to FIG. 10. The login processing is omitted from the following description.

The user terminal 1 performs monitoring in loop processing of steps S301 to S304. Here, the user terminal 1 monitors a content selection operation by the user, reception of management information from the web server 2, a page feeding operation by the user, and a termination operation of the user.

If the user terminal 1 detects a content selection operation by the user in step S301, the processing proceeds to step S311. The user terminal 1, in step S311, performs processing for requesting management information from the web server 2.

The management information includes file size information of the e-book selected by the user, identification information of each page, offset of page position, other metadata related to the e-book, and the like.

Upon receiving the management information request, the web server 2 acquires management information corresponding to the request from the DB 3 and transmits the acquired information to the user terminal 1.

After the user terminal 1 has executed the processing in step S311, the processing proceeds to step S302.

The user terminal 1, in step S302, confirms whether the management information requested in step S311 has been received from the web server 2. If the user terminal 1 confirms the reception of the management information in step S302, the processing proceeds to step S321.

The user terminal 1, in step S321, stores the received management information in the management information storage area 16 illustrated in FIG. 3.

The user terminal 1, by acquiring the management information, is brought into a state where it can request the web server 2 for a part of the page data constituting the e-book. Specifically, the user terminal 1 can request the web server 2 for page data of a specific page, for example, only the fifth page.

After step S321, in step S322, the user terminal 1 performs processing for requesting page data of the first page PG1 of the selected e-book from the web server 2. Then, the processing proceeds from step S322 to step S323 in which the user terminal 1 confirms reception of the page data of the first page PG1 from the web server 2. The user terminal 1 waits until receiving the page data of the first page PG1 from the web server 2 in step S323. If the reception of the page data has been confirmed, the processing proceeds to step S324 in which the received page data is stored in the page data cache area 19.

Subsequently, the processing proceeds from step S324 to step S325 in which the user terminal 1 causes the display unit 71 to display the received page data of the first page PG1. As a result, the user can perform a page feeding operation via the display unit 71.

If the user terminal 1 detects a page feeding operation by the user in step S303, the processing proceeds to step S331. In this embodiment, the page feeding operation is, for example, the flick operation illustrated in FIG. 7A or FIG. 8A.

The user terminal 1, in step S331, performs operation determination processing for determining whether the page feeding operation is a one-shot operation or a continuous operation. Subsequently, in step S332, the user terminal 1 performs page request processing according to the operation determination processing. The operation determination processing and the page request processing will be described in detail below.

The user terminal 1, in step S304, confirms whether a termination operation has been performed by the user. If the user terminal 1 detects the termination operation in step S304, the processing proceeds to step S341. In this embodiment, the termination operation is an operation for terminating the browsing of the comic magazine C1, which can be performed by selecting a termination button from a menu screen displayed on the display unit 71 or by operating a termination switch provided on the user terminal 1.

The user terminal 1, in step S341, executes processing for deleting the page data of the comic magazine C1 stored in the page data cache area 19. In this manner, securing a free space again in the storage region when terminating the browsing of the e-book can effectively use the storage region.

Subsequently, in step S342, the user terminal 1 performs termination processing to terminate the e-book browsing using the present service.

After completing the processing of steps S311, S325, S332, and S342, the user terminal 1 performs the monitoring loop processing again in step S301 to S304.

Figure 10:
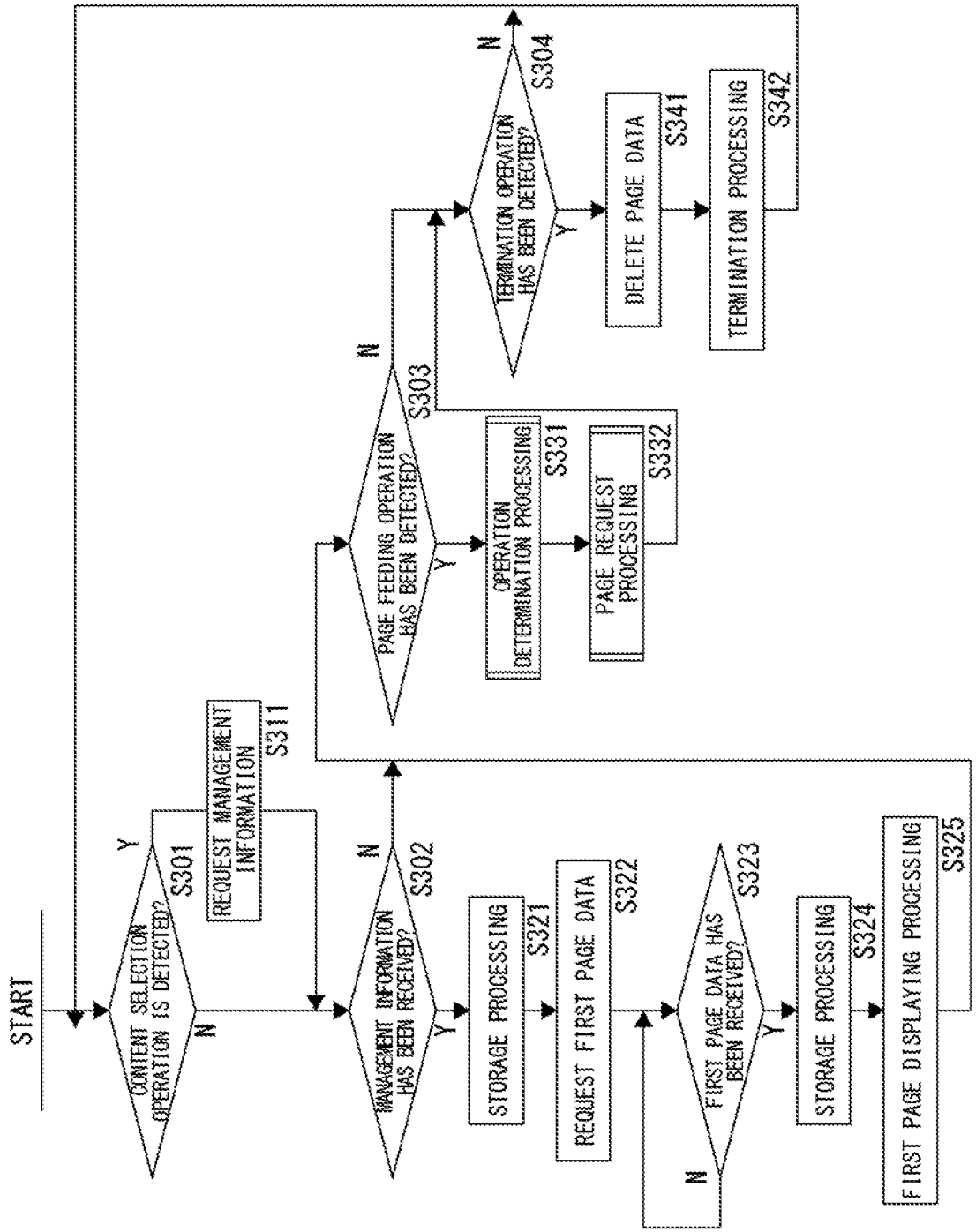
FIG. 10 is an explanatory diagram illustrating web server processing according to the first embodiment.

Although not illustrated in the present embodiment, the user terminal 1 performs various processing according to operations of the user via the touch panel or the like, in addition to the processing illustrated in FIG. 10.

Hereinafter, the operation determination processing in step S331 will be described in detail below with reference to FIG. 11. In the operation determination processing, the user terminal 1 determines the operation type of the page feeding operation performed by the user, and when the operation type is the continuous operation, calculates the number of page feeding operations having been performed as the continuous operation.

First, the user terminal 1 clears a continuous operation flag described below in step S401, and resets a variable CT, which indicates the number of the page feeding operations during the continuous operation, to zero in step S402.

The user terminal 1, in step S403, resets a timer TM that measures the operation determination period t from the page feeding operation, and starts measurement. In the first embodiment, the operation determination period t is set in advance in the user terminal 1.

Subsequently, the user terminal 1 performs monitoring in steps S404 and S405 until the operation determination period t elapses. The user terminal 1 monitors in step S404 to check whether the operation determination period t has elapsed and monitors in step S405 to check whether the page feeding operation has been performed again.

If the page feeding operation has not been detected again in step S405 and it is determined that the operation determination period t has elapsed in step S404, the processing of the user terminal 1 proceeds to step S406.

The user terminal 1, in step S406, confirms whether the continuous operation flag is ON, in this case, since the continuous operation flag is OFF, the user terminal 1 completes the operation determination processing, and the processing proceeds from step S406 to step S332 in FIG. 10.

That is, when the continuous operation flag is not ON, the feeding operation is in the state of the one-shot operation described above.

Next, after the processing proceeds from step S401 to step S402 and further to step S403 in the same manner as described above, if the page feeding, operation is detected again in step S405 before the operation determination period t elapses in step S404, the processing of the user terminal 1 proceeds to step S407.

The user terminal 1, in step S407, resets the timer TM, and starts measuring the operation determination time t again. Then, the processing proceeds to step S408 in which the user terminal 1 confirms whether the continuous flag is ON. When the continuous operation flag is OFF, the processing proceeds to step S409 in which the user terminal 1 executes processing for setting the continuous flag to ON. If the continuous operation flag is already ON, the processing in step S409 is unnecessary and is not performed.

The user terminal 1, when the processing proceeds to step S410, performs processing for causing the display unit 71 to display the page transition screen. In the comic magazine C1 according to the first embodiment, the user terminal 1 displays, as the page transition screen, a page of blank frames in which no content is described as illustrated in FIG. 8B. In this manner, the page transition screen according to the genre of the e-book is displayed on the display unit 71.

Here, for example, when the genre of the e-book is "book" mainly containing sentences, the user terminal 1 may cause the display unit 71 to display, as a page transition screen, a character string that is so blurred that characters cannot be visually recognized. The user terminal 1 stores, in the storage region, page data of page transition screens, in advance, according to the genre of an e-book.

Displaying the page transition screen according to the genre of the e-book currently browsed in this manner can give realistic and natural page turning feeling to the user.

Subsequently, in step S411, the user terminal 1 adds 1 to the variable CT (CT=CT+1), and then the processing returns to step S404 to perform the monitoring loop processing again in steps S404 and S405.

If the page feeding operation is detected again in step S405 before the operation determination period elapses in a state where the continuous operation flag is ON, the processing proceeds from step S407 to steps S408, S410, and S411 successively, and the user terminal 1 adds 1 to the variable CT (CT=CT+1), and then the processing proceeds to step S404.

As described above, each time the page feeding operation is detected in step S405 before the operation determination period elapses, the user terminal 1 continuously increments the variable CT.

Then, if the operation determination period t elapses in step S404 without detecting the page feeding operation again in step S405, the processing of the user terminal 1 proceeds to step S406. In this case, since the continuous operation flag is ON, the processing proceeds to step S412 in which the user terminal 1 sets the incremented value of the variable CT as an operation number-of-times NCT of the page feeding operations.

After step S412, the user terminal 1 completes the operation determination processing, and the processing proceeds to step S332 in FIG. 10.

The page request processing in step S332 will be described in detail below with reference to FIG. 12. In the page request processing, the user terminal 1 determines page data for which a download request (distribution request) to the web server 2 is to be made according to the operation type determination processing having been performed in step S331, and causes the display unit 71 to display the page data received from the web server 2 and stored in the page data cache area 19.

First, page request processing to be performed when the user's page feeding operation is a one-shot operation will be described. The user terminal 1, in step S501, confirms whether or not the continuous operation flag is ON. If it is confirmed in step S501 that, the continuous operation flag is OFF, the processing of the user terminal 1 proceeds to step S502. That is, the user terminal 1 determines that the page feeding operation detected by the operation determination processing in step S331 in FIG. 10 is a one-shot operation.

The user terminal 1 that has determined that the page feeding operation is a one-shot operation, in step S502, determines a display target page according to the page feeding operation direction. The display target page is a transition destination page to be displayed on the display unit 71. In step S502, if the page feeding operation direction is forward, the user terminal 1 determines a page next to the page currently displayed on the display unit 71 as the display target page. If the page feeding operation direction is backward, the user terminal 1 determines a page retrogressing by one from the page currently displayed on the display unit 71 as the display target page.

Subsequently, in step S503, the user terminal 1 confirms whether the display target page is already stored in the page data cache area 19. If the display target page is not stored in the page data cache area 19 in step S503, the processing proceeds to step S504 in which the user terminal 1 transmits a page data request of the display target page to the web server 2.

The user terminal 1, in step S505, waits until receiving the page data of the display target page from the web server 2. Upon receiving the page data in step S505, the user terminal 1 performs in step S506 storage processing for storing the received page data in the page data cache area 19.

Subsequently, the processing proceeds from step S506 to step S507 in which the user terminal 1 performs control for displaying the display target page on the display unit 71. As a result, the display unit 71 displays the page next to the currently displayed page as the display target page.

At this time, the user terminal 1 performs the display control processing before requesting page data of a neighboring page from the web server 2. That is, the neighboring page determination and the storage processing are performed after the already acquired display target page is displayed on the display unit 71. As a result, a waiting time due to the neighboring page determination and the storage processing is not caused before a new page is displayed, and the user can comfortably browse the display target page.

The user terminal 1, after the display control of the display target page in step S507, performs in step S508 page range determination processing for determining a range in which a download request of the page neighboring to the display target page is performed. That is, the user terminal 1 determines the ranges of forward neighboring pages and backward neighboring pages for which page data should be requested.

Here, the forward neighboring pages are neighboring pages positioned on the page advancing side when viewed from the display target page, and the backward neighboring pages are neighboring pages positioned on the page retrogressing side when viewed from the display target page.

In the first embodiment, the forward neighboring pages and the backward neighboring pages are set in advance as pages to be requested. In this embodiment, the user terminal 1 determines, as forward neighboring pages, a 3-page range in the page advancing direction from the display target page, and determines, as backward neighboring pages, a 3-page range in the page retrogressing direction from the display target page.

Other examples of the page range determination processing will be described below.

The processing proceeds from step S508 to step S509 in which the user terminal 1 confirms whether the page data cache area 19 stores a page tout-of-range page) other than the display target page and the neighboring pages. If the user terminal 1 determines in step S509 that the out-of-range page is not stored in the page data cache area 19, the processing proceeds to step S511.

If the out-of-range page is already stored in the page data cache area 19 in step S509, the processing proceeds to step S510 in which the user terminal 1 performs storage management processing. In the first embodiment, the user terminal 1 performs processing for deleting the out-of-range page from the page data cache area 19 as the storage management processing. Deleting the page that is less likely to be browsed by the user before storing the page data of the neighboring page in the storage region enables the user terminal 1 to request the page data from the web server 2 in a state where the storage capacity for storing the neighboring pages is sufficiently secured.

Other examples of the storage management processing for deleting the page data stored in the storage medium, performed by the user terminal 1, will be described below.

The user terminal 1, in step S511, confirms the presence of page data of a neighboring page that is not stored in the page data cache area 19. If there is page data that is not yet stored in step S511, then in step S512, the user terminal 1 performs processing for requesting from the web server 2 the page data of the neighboring page not stored in the page data cache area 19.

The user terminal 1, in step S513, waits until receiving the requested page data of the neighboring page from the web server 2. Upon receiving the page data, the user terminal 1 performs in step S514 storage processing for storing the received page data of the neighboring page in the page data cache area 19.

As a result, when the page data of the display target page to be displayed on the display unit 71 is stored in the storage region, page data of a page neighboring to the display target page, which is considered to be likely to be browsed by the user, can be also stored. Storing pages other than the display target page in advance in the storage region can quickly respond to the user's page feeding operation.

Further, although storing the pages other than the display target page in advance in the storage region can quickly respond to the user's page feeding operation, if page data of neighboring pages are stored in the storage region for each storage of the page data of the display target page, the storage capacity of the storage region will be suppressed.

Therefore, the storage region can be effectively used by regularly performing the storage management processing for deleting the page data stored in the storage region as illustrated in step S510.

After the storage processing in step S514, the user terminal 1 completes the page request processing in step S332. Then, the processing proceeds to step S304 in FIG. 10.

Figure 12:
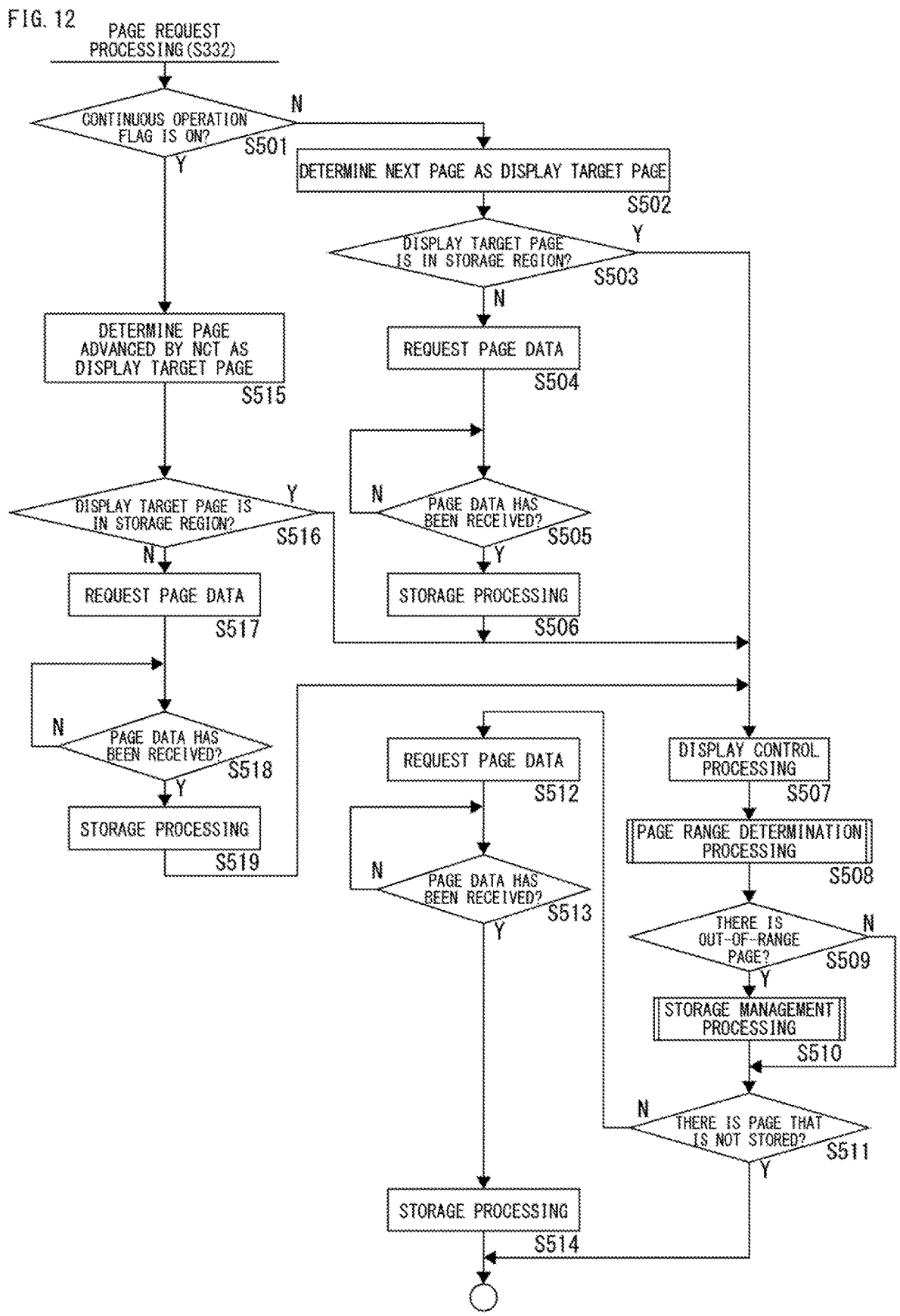
FIG. 12 is an explanatory diagram illustrating page request processing according to the first embodiment.

Further, as the page data in the page range determined in step S508, if it is determined in step S512 that there is no page data that is not stored in the page data cache area 19, the user terminal 1 terminates the processing in FIG. 12 (step S332 in FIG. 10).

However, in step S503, the page data of the display target page may already be stored in the page data cache area 19 even when the continuous operation flag is the same OFF state (one-shot operation). When the display target page determined in step S502 is already stored in the page data cache area 19, the processing of the user terminal 1 proceeds from step S501 to steps S502, S503, and S507 successively, thereby causing the display unit 71 to display the display target page without performing processing for requesting the page data from the web server 2. After the processing in step S507, the user terminal 1 performs the subsequent processing in steps S507 to S514 in the same manner as described above.

After the user terminal 1 completes the page request processing in step S332, the processing proceeds to step S304 in FIG. 10.

Next, page request processing to be performed when the user's page feeding operation is a continuous operation will be described, in this case, since the continuous operation flag is ON, the processing of the user terminal 1 proceeds from step S501 to step S515.

In step S515, the user terminal 1 determines, as the display target page, a page advanced from the currently displayed page by NCT representing the number of times of the page feeding operations being determined as a continuous operation. For example, in FIG. 8A, in a state where the page PG1 is displayed on the display unit 71, it is assumed that the user has performed, as a continuous operation, the right tuck operation three times (page feeding operation number-of-times NCT=3). In this case, the page PG4 advanced by three pages from the page PG1 is determined as the display target page. Further, it is assumed that the right flick operation has been performed 10 times (page feeding operation number-of-times NCT=10), in this case, a page PG11 advanced by 10 pages from the page PG1 is determined as the display target page. Farther, in a state where a page PG10 is displayed on the display unit 71, if the user has performed the left flick operation five times, a page PG5 retrogressing by five pages from the page PG10 is determined as the display target page.

Subsequently, in step S516, the user terminal 1 confirms whether the display target page is already stored in the page data cache area 19. If the display target page is not stored in the page data cache area 19 in step S516, the processing proceeds to step S517 in which the user terminal 1 transmits a request for the page data of the display target page to the web server 2. According to the above example, the user terminal 1 transmits a distribution request for the page data of the page PG4 being the display target page to the web server 2.

In step S518, the user terminal 1 waits until receiving the page data of the display target page from the web server 2. Upon receiving the page data in step S518, the user terminal 1 performs in step S519 storage processing for storing the page data in the page data cache area 19.

Then, the processing proceeds from step S519 to step S507 in which the user terminal 1 performs control for displaying the display target page on the display region of the display unit 71. As a result, a page advanced by NCT from the currently displayed page is displayed, as a display target page, on the display unit 71. According to the above example in which the right flick operation is performed three times, the user terminal 1 causes the display unit 71 to display the page PCi4 being the display target page as illustrated in FIG. 8C.

After the processing in step S507, the user terminal 1 performs the subsequent processing in steps S507 to S514 in the same manner as described above and terminates the processing in FIG. 12 (step S332 in FIG. 10).

Further, if the user terminal 1 confirms in step S516 that the page data of the display target page is stored in the page data cache area 19 after determining the display target page in step S515, the user terminal 1 acquires the page data from the page data cache area 19 without requesting the page data from the web server 2. Then, in step S507, the user terminal 1 causes the display unit 71 to display the display target page.

Alter the processing in step S507, the user terminal 1 performs subsequent processing in steps S507 to S514 in the same manner as described above and terminates the processing in FIG. 12 (step S332 in FIG. 10).

4. Second Embodiment

A second embodiment will be described with reference to FIG. 13.

In the second embodiment, the user terminal 1 is configured to determine the page ranges of forward neighboring pages and backward neighboring, pages in the page range determination processing (step S508 in FIG. 12) based on terminal information of the user terminal 1.

In the page range determination processing, first, in step S601, the user terminal 1 acquires information on the storage capacity of the storage region of the memory, from the terminal information of the user terminal 1 itself. Then, in step S602, the user terminal 1 determines whether the memory storage capacity of the user terminal 1 is equal to or greater than a threshold thC. The threshold thC is a preset value. When the capacity of the user terminal 1 is equal to or greater than the threshold thC, it is determined that the user terminal 1 has a sufficient storage region.

If the storage capacity of the user terminal 1 is less than the threshold thC in step S602, it can be said that the user terminal 1 cannot allocate a sufficient storage capacity when downloading the comic magazine C1 in the present service.

Therefore, in this case, the processing proceeds from step S602 to step S605 in which the user terminal 1 determines, as forward neighboring pages, three pages in the page advancing direction from the display target page displayed on the display unit 71.

Then, in the subsequent step S606, the user terminal 1 determines, as backward neighboring pages, three pages in the page retrogressing direction from the display target page.

After the processing in step S606, the user terminal 1 completes the page range determination processing, and the processing proceeds to step S509 in FIG. 12.

On the other hand, if the storage capacity of the user terminal 1 is equal to or greater than the threshold thC in step S602, the memory storage region is relatively sufficient and therefore the user terminal 1 can use a relatively large storage capacity when downloading the comic magazine C1 in the present service.

Therefore, in step S602, if the storage capacity of the user terminal 1 is equal to or greater than the threshold thC, the processing proceeds to step S603 in which the user terminal 1 determines, as forward neighboring pages, five pages, i.e., pages more than three pages, in the page advancing direction from the display target page displayed on the display unit 71.

Then, in step S604, the user terminal 1 determines, as backward neighboring pages, five pages, i.e., pages more than three pages, in the page retrogressing direction from the display target page.

After the processing in step S604, the user terminal 1 completes the page range determination processing, and the processing proceeds to step S509 in FIG. 12.

In the second embodiment, when the storage capacity of the user terminal 1 is relatively sufficient, forward neighboring pages and backward neighboring pages in larger page ranges can be set to be larger in the storage region. Thus, even when the user suddenly performs one-shot operations continuously, the transition destination page can be quickly displayed without any communication with the web server 2.

The storage capacity to be compared with the threshold thC may he determined considering setting conditions of the cache area 19 in the user terminal 1. For example, it may be the capacity of the RAM 103 or may be a capacity allocated to e-book browsing software (application program) in the user terminal 1. Further, it may be a capacity of an area settable as the page data cache area 19.

5. Third Embodiment

A third embodiment will be described with reference, to FIGS. 14 and 15.

In the third embodiment, the user terminal 1 is configured to determine the page ranges of forward neighboring pages and backward neighboring pages based on the remaining amount of the page data cache area 19 in the user terminal 1 in the page range determination processing (step S508 in FIG. 12).

Further, the user terminal 1 is configured to delete the page data that the user has already browsed based on the remaining amount of the storage region in the page data cache area 19, in the storage management processing (step S510 in FIG. 12).

First, the page range determination processing according to the third embodiment will be described with reference to FIG. 14.

In step S701, the user terminal 1 acquires, from the terminal information of the user terminal 1 itself, remaining storage amount information representing the remaining amount of the storage capacity in the page data cache area 19. Then, in step S702, the user terminal 1 determines whether the remaining storage amount of the page data cache area 19 thereof is equal to or less than a threshold thR1. The threshold thR1 is a preset value at which it is assumed that it will soon become difficult to store the page data received from the web server 2 as the remaining amount of the storage region in the page data cache area 19 continuously decreases.

If the remaining storage amount is equal to or less than the threshold thR1 in step S702, the processing proceeds from step S702 to step S706 in which the user terminal 1 determines, as a forward neighboring page, a page advanced by one, which is less than three, i.e., the number of pages usually set, from the display target page.

Then, in the subsequent step S707, the user terminal 1 determines, as a backward neighboring page, a page retrogressing by one, which is less than the usual value, from the display target page.

Determining, for each of the forward neighboring pages and the backward neighboring pages, the number of pages to be smaller than the usual value when the remaining storage amount of the page data cache area 19 is insufficient can reduce the number of page data to be stored in the storage region and can prevent the remaining storage amount from being suppressed due to page data that the user may not always browse.

After the processing in step S707, the user terminal 1 completes the page range determination processing, and the processing proceeds to step S509 in FIG. 12.

Further, if the remaining amount of the storage region is greater than the threshold thR1, the processing proceeds to step S703 in which the user terminal determines whether the storage capacity of the page data cache area 19 thereof is equal to or greater than the threshold thR2.

The threshold thR2 is an arbitrary preset value and is a value greater than the threshold thR1. The value equal to or greater than the threshold thR2 indicates a state where the remaining storage amount of the page data cache area 19 is considered to be rather sufficient.

Therefore, if the remaining storage amount is equal to or greater than the threshold thR1 in step S702 and is equal to or greater than the threshold thR2 in step S703, the processing proceeds from step S703 to step S708 in which the user terminal 1 determines, as forward neighboring pages, five pages, i.e., pages more than three pages usually set, from the display target page.

Then, in the subsequent step S709, the user terminal 1 determines, as backward neighboring pages, five pages, i.e., pages more than the usual value, from the display target page.

After the processing in step S709, the user terminal 1 completes the page range determination processing, and the processing proceeds to step S509 in FIG. 12.

In step S703, if the user terminal 1 determines that the remaining storage amount is less than the threshold thR2, the remaining storage amount is a value greater than the threshold thR1 and less than the threshold thR2. In such a case, the processing proceeds from step S703 to step S704 in which the user terminal 1 determines, as forward neighboring pages, three pages from the display target page displayed on the display unit 71.

Then, in the subsequent step S705, the user terminal 1 determines, as backward neighboring pages, three pages from the display target page.

After the processing M step S705, the user terminal 1 completes the page range determination processing, and the processing proceeds to step S509 in FIG. 12.

In the third embodiment, when the remaining storage amount of the page data cache area 19 is relatively sufficient, forward neighboring pages and backward neighboring pages in larger page ranges can be stored in the storage region. Thus, even when the user suddenly performs one-shot operations continuously, the transition destination page can be quickly displayed without any communication with the web server 2.

Next, the storage management processing (step S510 in FIG. 12) according to the third embodiment will be described with reference to FIG. 15.

In step S801, the user terminal 1 determines whether or not the remaining storage amount of the pace data cache area 19 is equal to or less than the threshold thR1. In step S801, if the remaining storage amount is greater than the threshold thR1, it is determined that the page data cache area 19 has a sufficient capacity to store new page data. Therefore, the user terminal 1 completes the storage management processing without deleting the page data stored in the page data cache area 19, and the processing proceeds to step S511 in FIG. 12.

In step S801, if the user terminal 1 determines that the remaining storage amount of the page data cache area 19 is equal to or less than the threshold thR1, the processing proceeds to step S802. The user terminal 1, in step S802, refers to the page management information storage area 18 and determines whether the confirmation has been completed for all the page data stored in the page data cache area 19.

In step S802, if the processing is not yet completed for all the page data, the processing proceeds to step S803 in which the user terminal 1 selects unprocessed page data. Then, in step S804, the user terminal 1 determines whether the confirmed page data is already browsed. If the page data is not yet browsed, the processing proceeds to step S802 in which the user terminal 1 repetitively performs the sequential processing of steps S802, S803, and S804.

If the confirmed page data is already browsed in step S804, the processing proceeds to step S805 in which the user terminal 1 deletes the page data from the storage region. As a result, the remaining storage amount of the storage region increases.

Subsequently, the processing returns to step S801 in which the user terminal 1 confirms whether the remaining storage amount after deletion of the page data is greater than the threshold thR1. At this time, in step S801, if the remaining storage amount is greater than the threshold thR1, it is determined that the remaining storage amount is sufficiently large to store new page data in the storage region. Therefore, the user terminal 1 completes the storage management processing without deleting the page data stored in the storage region any more, and the processing proceeds to step S511 in FIG. 12.

If the remaining storage amount is still equal to or less than the threshold thR1 in step S801, again in step S802, the user terminal 1 determines whether the confirmation has been completed for all the page data. If the confirmation has been completed for all the page data in step S802, the user terminal 1 completes the storage management processing without deleting the page data stored in the storage region any more, and the processing proceeds to step S511 in FIG. 12.

On the other hand, if there is any page data to be confirmed, the processing proceeds to step S803 in which the user terminal 1 performs the above processing in the same manner.

In the third embodiment, although the user terminal 1 performs the storage management processing as a part of the page request processing (step S332 in FIG. 10), the storage management processing may be performed, for example, at intervals of 30 seconds, one minute, or 10 minutes, as batch processing.

In the third embodiment, according to the remaining storage amount of the page data cache area 19, the page ranges of forward neighboring, pages and backward neighboring pages can be changed and stored in the page data cache area 19. As a result, if the remaining storage amount is sufficient, by storing a relatively larger amount of page data of forward neighboring pages and backward neighboring pages in the page data cache area 19, the transition destination page can be quickly displayed without any communication with the web server 2 even when, for example, the user suddenly performs one-shot operations continuously. On the other hand, if the remaining storage amount is insufficient, by determining, the number of forward neighboring pages and backward neighboring pages to be smaller than the usual value so that the number of page data to be stored in the page data cache area 19 can be reduced, the remaining storage amount can be prevented from being suppressed due to page data that the user may not necessarily browse.

Further, when the remaining storage amount is insufficient, performing not only the storage of page data to the page data cache area 19 but also the deletion of already browsed page data by the storage management processing can automatically secure the remaining storage amount sufficiently.

6. Fourth Embodiment

A fourth embodiment will be described with reference to FIG. 16.

In the fourth embodiment, the user terminal 1 determines the page ranges of forward neighboring pages and backward neighboring pages to be determined in the page range determination processing (step S508 in FIG. 12) based on the interval between one-shot operations performed by the user.

First, in step S901, the user terminal 1 acquires operation history information of the one-shot operation from the operation history information storage area 17. Then, in step S902, the user terminal 1 calculates a user's one-shot operation interval. The user's one-shot operation interval is the interval of one-shot operations considered to be performed to advance the next page while the user reads an e-book.

The one-shot operation interval may be obtained as an average value of time intervals between one-shot operations having been ever performed by the user. To this end, for example, 20 samples of recently performed one-shot operations may be selected to obtain a moving average value. Further, the maximum value or the minimum value of the time interval between two one-shot operations may be set as the one-shot operation interval.

After calculating the one-shot operation interval in step S902, the user terminal 1 determines in step S903 whether or not the one-shot operation interval is equal to or less than a threshold thI1. The threshold thI1 is a preset value serving as a criterion for determining that the interval between one-shot operations performed by the user is short. The threshold thI1 is set as a short period such as 10 seconds, 30 seconds, or one minute.

When the one-shot operation interval is equal to or less than the threshold thI1, it can be determined that the interval of one-shot operations performed by the user is very short. That is, it is determined that the reading speed is very fast when the user reads an e-book.

If the one-shot operation interval is equal to or less than the threshold dill in step S903, the processing of the user terminal 1 proceeds to step S907.

In step S907, the user terminal 1 determines, as forward neighboring pages, a 5-page range in the page advancing direction from the display target page. Subsequently, in step S906, the user terminal 1 determines, as backward neighboring pages, a 5-page range in the page retrogressing direction from the display target page.

That is, for a user who performs one-shot operations at very short intervals and is very fast in reading speed, forward neighboring pages and backward neighboring pages whose number of pages is larger than the preset number of pages are set. As a result, a greater amount of forward and backward neighboring pages can be stored in the storage region, and therefore the user even when performing quick page feeding operations can enjoy reading without requiring a waiting time such as download time.

The user terminal 1 completes the page range determination processing after step S908, and the processing proceeds to step S509 in FIG. 12.

When the one-shot operation interval is greater than the threshold thI1 the processing proceeds to step S904 in which the user terminal 1 determines whether or not the one-shot operation interval is equal to or greater than a threshold thI2. The threshold thI2 is a preset value serving, as a criterion for determining that the interval between one-shot operations performed by the user is long.

The threshold thI2, is a value greater than the threshold thI1 and is set as a relatively long period such as 3 minutes, 5 minutes, or 10 minutes.

When the one-shot operation interval is equal to or greater than the threshold thI2, it can be determined that the interval of one-shot operations performed by the user is very long. That is, it is determined that the reading speed is very slow when the user reads an e-book.

Further, when the one-shot operation interval is equal to or greater than the threshold thI2, the processing of the user terminal 1 proceeds from step S904 to step S909. In step S909, the user terminal 1 determines, as a forward neighboring page, a 1-page range in the page advancing direction from the display target page. Subsequently, in step S910, the user terminal 1 determines, as a backward neighboring page, a 1-page range in the page retrogressing direction from the display target page.

That is, for a user who performs one-shot operations at very long intervals and is slow in reading speed, the necessity of storing data of pages far ahead in the storage region is not high. Therefore, the number of forward neighboring pages and the number of backward neighboring pages are set to be smaller than the preset number of pages. As a result, the storage region of the page data cache area 19 is not suppressed, and the storage region can be effectively used.

The user terminal 1 completes the page range determination processing after step S910, and the processing proceeds to step S509 in FIG. 12.

If the user terminal 1 determines that the one-shot operation interval is greater than the threshold thI1 and less than the threshold thI2, the processing of the user terminal 1 proceeds from step S901 to steps S902, S903, S904, and S905 successively. Then, in step S905, the user terminal 1 determines, as forward neighboring pages, a 3-page range in the page advancing direction from the display target page. Subsequently, in step S906, the user terminal 1 determines, as backward neighboring pages, a 3-page range in the page retrogressing direction from the display target page.

That is, when the user's one-shot operation interval is greater than the threshold thI1 and less than the threshold thI2, a preset standard page range is determined as the forward neighboring pages and the backward neighboring pages.

The user terminal 1 completes the page range determination processing after step S906, and the processing proceeds to step S509 in FIG. 12.

7. Fifth Embodiment

A fifth embodiment will be described with reference to FIG. 17.

In the fifth embodiment, the user terminal 1 determines the page ranges of forward neighboring pages and backward neighboring pages to be determined in the page range determination processing (step S508 in FIG. 12) based on the frequency of page retrogressing operations performed by the user.

Here, the page retrogressing operation is an operation for turning the page in the page retrogressing direction, as one of user's page feeding operations.

First, in step S001, the user terminal 1 acquires operation history information of the user from the operation history information storage area 17, and in step S1002, calculates a page retrogressing operation frequency.

The page retrogressing operation frequency is obtainable by calculating the ratio of page retrogressing operations to user's page feeding operations. It is also feasible to obtain the page retrogressing, frequency by selecting one-shot operations from page feeding operations and calculating the ratio of page retrogressing operations. Further, regarding the operation history to be used in the calculation, the history of all the operations having been ever performed may be referred to or the history of ten operations recently performed may be referred to. In this manner, there are various methods for calculating the page retrogressing operation frequency.

After calculating the page retrogressing operation frequency in step S1002, the user terminal 1 determines in step S1003 whether or not the page retrogressing operation frequency is equal to or greater than a threshold thF1. The threshold thF1 is a preset value serving as a criterion for determining that the frequency of page retrogressing operations by the user is high. The threshold thF1 is set as a numerical value such as 10%, 15%, or 20%.

When the page retrogressing operation frequency is equal to or greater than the threshold thF1, it is determined that the user's page retrogressing frequency is high.

In step S1003, if the page retrogressing operation frequency is equal to or greater than the threshold thF1, the processing of the user terminal 1 proceeds to step 1007.

Subsequently, in step S1007, the user terminal 1 determines, as forward neighboring pages, a 2-page range, which is less than three pages, in the page advancing direction from the display target page. Then, in step S1006, the user terminal 1 determines, as backward neighboring pages, a 4-page range, which is more than three pages, in the page retrogressing direction from the display target page.

That is, when the user is likely to perform the page retrogressing operation, there is a higher possibility of returning to a past page and therefore the number of pages greater than the preset number of pages is set as the backward neighboring pages. As a result, a greater number of backward neighboring pages can be stored in the storage region. Therefore, the user, even when frequently performing page retrogressing operations, can enjoy browsing without requiring a waiting time such as download time.

The user terminal 1 completes the page range determination processing after step S1008, and the processing proceeds to step S509 in FIG. 12.

Further, if page retrogressing operation frequency is equal to or greater than the threshold thF1, the processing proceeds to step S1004 in which the user terminal 1 determines whether or not page retrogressing operation frequency is equal to or less than a threshold thF2. The threshold thF2 is a preset value serving as a criterion for determining that the frequency of page retrogressing operations by the user is low. The threshold thF2 is a value smaller than the threshold thF1 and is set as a relatively smaller numerical value such as 3%, 5%, or 10%.

When page retrogressing operation frequency is equal to or less than the threshold thF2, it is determined that the frequency of page retrogressing operations performed by user is very low.

When page retrogressing operation frequency is equal to or less than the threshold thF2, the processing of the user terminal 1 proceeds from step S1004 to step S1009. In step S1009, the user terminal 1 determines, as forward neighboring pages, a 4-page range more than three pages in the page advancing direction from the display target page. Subsequently, in step S1010, the user terminal 1 determines, as backward neighboring pages, a 2-page range less than three pages in the page retrogressing direction from the display target page.

That is, for a user who is less likely to perform the page retrogressing operation, there is a lower possibility of returning to past page data. Therefore, by setting backward neighboring pages whose number of pages is less than the preset number of pages, the storage region can be effectively used.

Further, for the user who is less likely to perform the page retrogressing operation, it is considered that the ratio of operations in the page advancing direction to page feeding operations becomes relatively higher. Therefore, by setting forward neighboring pages whose number of pages is greater than the preset number of pages, the next page can be displayed without making the user wait.

The user terminal 1 completes the page range determination processing after step S1010, and the processing proceeds to step S509 in FIG. 12.

In step S1004, if it is determined that the ratio of page retrogressing operations is higher than the threshold thF2, the processing of the user terminal 1 proceeds to step S1005. Subsequently, in step S1005, the user terminal 1 determines, as forward neighboring pages, a 3-page range in the page advancing direction from the display target page. Then, in step S1006, the user terminal 1 determines, as backward neighboring pages, a 3-page range in the page retrogressing direction from the display target page.

That is, when the user's page retrogressing operation frequency is smaller than the threshold thF1 and greater than the threshold thF2, a preset standard page range is determined as the forward neighboring pages and the backward neighboring pages.

The user terminal 1 completes the page range determination processing after step S1006, and the processing proceeds to step S509 in FIG. 12.

8. Sixth Embodiment

A sixth embodiment will be described with reference to FIG. 18A.

In the sixth embodiment, the operation determination period calculation processing for calculating the operation determination period t to be used in step S404 of FIG. 11 will be described. The user terminal 1 calculates the operation determination period t using the operation history information of the user.

The operation determination period calculation processing can be performed as batch processing. As the timing at which the batch processing is performed, various timings will be considered, such as when the operation history information storage area 17 is updated or at 10-minute intervals or predetermined periods.

First, in step S1101, the user terminal 1 acquires the operation history information from the operation history information storage area 17. Subsequently, in step S1102, the user terminal 1 selects the operation intervals of the page feeding operations equal to or less than a predetermined value determined in advance. The predetermined value is an arbitrary preset value. For example, if the interval of page feeding operations is live seconds or longer even when performed continuously, it is difficult to say that these operations are continuous. From this reason, it can be said that selecting only the page feeding operations performed at the interval equal to or less than the predetermined value can enhance the accuracy with respect to the interval of a continuous operation performed by the user.

Examples of the predetermined value include 0.3 seconds, 0.5 seconds, and 1.5 seconds.

After selecting operation intervals of the operations whose interval is equal to or less than the predetermined value, the user terminal 1 calculates an average value of the selected operation intervals.

In step S1104, the user terminal 1 stores the calculated average value, as the operation determination period t, for example, in the storage unit 108 illustrated in FIG. 2, and completes the operation determination period calculation processing.

In this manner, regularly performing the operation determination period calculation processing can provide the operation timing that fits user's bodily sensation.

9. Seventh Embodiment

A seventh embodiment will be described with reference to FIG. 18B.

In the seventh embodiment, the operation determination period calculation processing for calculating the operation determination period t to be used in step S404 in FIG. 11 will be described. The user terminal 1 applies the operation determination period t according to the genre of an e-book that the user is currently reading.

The operation determination period calculation processing is performed as batch processing. The timing at which the batch processing is performed is, for example, the detection timing of a user's operation for selecting an e-book.

First, in step S1201, the user terminal 1 acquires genre information of an e-book displayed on the display unit 71 from the operation history information storage area 17. For example, in FIGS. 7A and 7B, the user terminal 1 acquires genre information of an e-book, such as "comic", from the operation history information storage area 17.

Next, in step S1202, the user terminal 1 acquires an operation determination period t corresponding to the acquired genre information. In this embodiment, the operation determination period t is set in advance for each type of e-books. For example, because of lowness in ratio of sentences in comparison with "paperback" and the like, the operation determination period t for "comic" and "magazine" is set to be shorter than that for "paperback".

Upon acquiring the operation determination period t corresponding to the type, the user terminal 1 stores, in step S1203, the acquired operation determination period tin the storage unit 108. Then, the user terminal 1 completes the operation determination period calculation processing.

As a result, setting the operation determination period t that suits the type of the e-book can provide an operation environment more comfortable for the user when performing page feeding operations.

10. Eighth Embodiment

An eighth embodiment will be described with reference to FIG. 19A.

In the eighth embodiment, the storage management processing to be performed in step S510 of FIG. 12 will be described. In the storage management processing, the user terminal 1 determines page data to be deleted based on the distance from the display target page.

In step S1301, the user terminal 1 confirms the page management information storage area 18 and selects a backward page that is outside the page range determined in step S508 of FIG. 12 and is furthest from the display target page. Then, in step S1302, the user terminal 1 deletes the selected page data.

The page data of a backward page furthest from the display target page is likely to be already browsed by the user, and the likelihood of browsing back is not so high. Occasionally deleting such page data that is less likely to be browsed by the user can sufficiently secure the free space in the storage region, and it becomes possible to effectively use the free storage region.

After step S1302, the user terminal 1 completes the storage management processing, and the processing proceeds to step S511 in FIG. 12.

In the eighth embodiment, the user terminal 1 performs the storage management processing as a pan of the page request processing (step S332 in FIG. 10). However, the storage management processing may be batch processing to be performed, for example, at intervals of 30 seconds, one minute, or 10 minutes.

11. Ninth Embodiment

A ninth embodiment will be described with reference to FIG. 19B.

In the ninth embodiment, the storage management processing to be performed in step S510 in FIG. 12 will be described. In the storage management processing, the user terminal 1 determines page data to be deleted based on the time when the page data has been stored in the page data cache area 19.

In step S1401, the user terminal 1 refers to the page management information storage area 18 and selects page data that is outside the page range determined in step S508 in FIG. 12 and is oldest in timing of storage. Then, in step S1402, the user terminal 1 deletes the selected page data.

The page data oldest in timing, of storage is likely to be already browsed by the user, and the likelihood of browsing back is not so high. Occasionally deleting such page data that is less likely to be browsed by the user can sufficiently secure the free space of the storage region, and it becomes possible to effectively use the free storage region.

After step S1402, the user terminal 1 completes the storage management processing, and the processing proceeds to step S511 in FIG. 12.

In the ninth embodiment, the user terminal 1 performs the storage management processing as part of the page request processing (step S332 in FIG. 10). However, the storage management processing may be batch processing to be performed, for example, at internals of 30 seconds, one minute, or 10 minutes.

12. Conclusion

The user terminal 1 described in the first through ninth embodiments includes the operation type determination unit 11 configured to detect a user's page feeding operation on content (e-book) containing a plurality of pages (step S303 in FIG. 10), determine a plurality of page feeding operations as a continuous operation if the page feeding operation has been performed again within a predetermined period (operation determination period t) from the page feeding operation, and determine a page feeding operation not falling under the continuous operation as a one-shot operation, the page request unit 12 configured to specify first storage target page data to be stored in a storage region according to the one-shot operation when a determination of the one-shot operation is made by the operation type determination unit 11 (steps S502 and S508 in FIG. 12), make no distribution request for page data according to the page feeding operation during a period in which the operation type determination unit 11 determines that the continuous operation is being performed, specify second storage target page data to be stored in the storage region (the page data cache area 19) according to the continuous operation (steps S515 and S508 in FIG. 12) when termination of the continuous operation is determined (step S404 in FIG. 11), and make a distribution request for page data not stored in the storage region (the page data cache area 19) among the specified first storage target page data or the second storage target page data, the storage management unit 13 configured to store page data distributed according to the distribution request in the storage region (the page data cache area 19), and the display control unit 14 configured to perform control for reading out page data from the storage region and displaying the readout page data in response to a user's page feeding operation (see FIG. 12).

Figure 11:
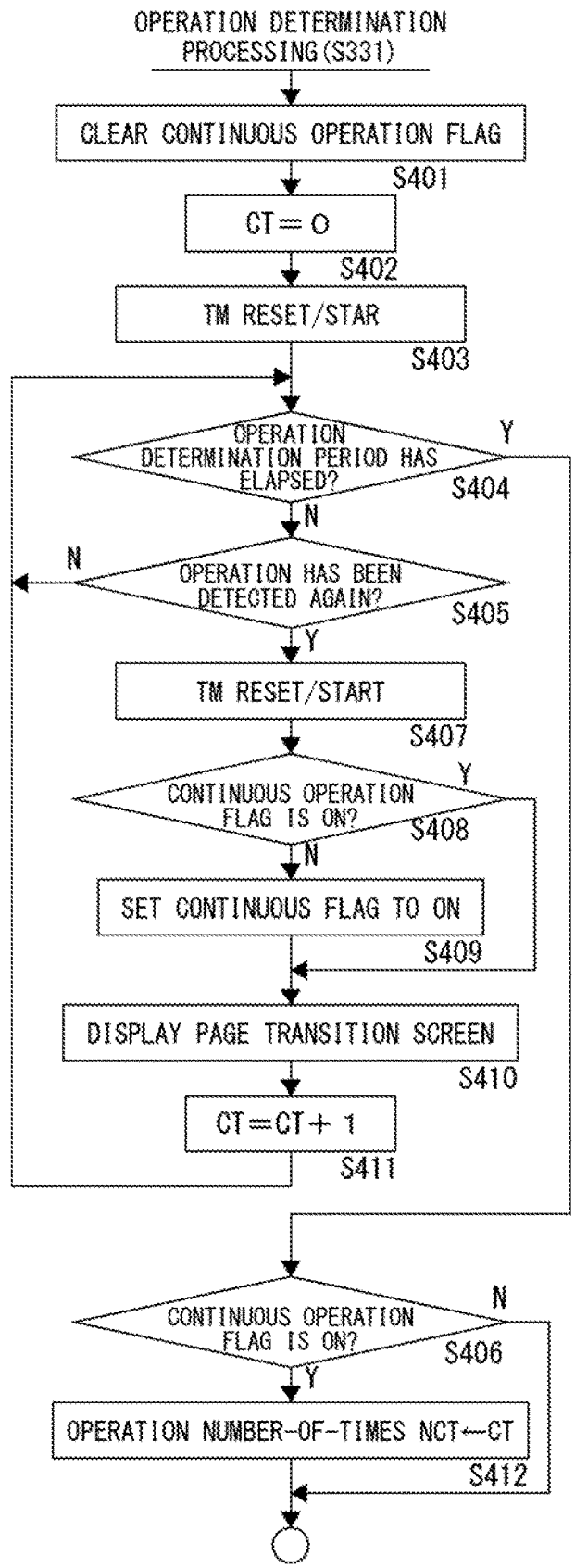
FIG. 11 is an explanatory diagram illustrating operation determination processing according to the first embodiment.

Here, the processing for determining a plurality of page feeding operations as a continuous operation when the page feeding operation has been performed again within the predetermined period (the operation determination period t) from the page feeding operation is the state where the user's page feeding operation is detected again in step S405 of FIG. 11.

Further, the processing for determining that the page feeding operation not falling under the continuous operation as the one-shot operation is performed in steps S405 to S411.

Further, the processing for determining the page feeding operation number-of-times NCT during the period of a continuous operation is performed in steps S411 and S412.

Further, the processing for suppressing the page data distribution request according to the page feeding operation during the period in which it is determined that the continuous operation is being performed is realized by having processing in steps S404 to S411 of FIG. 11 and not proceeding to the processing in FIG. 12 in response to each page feeding operation continuously performed.

That is, the operation type is automatically determined from the timing of the user's page feeding operation, and the page data to be requested according to the operation type is determined, and when necessary, the page data request processing is performed. Here, the "when necessary" indicates, for example, as described in the above example, the timing the page data request processing is performed on the assumption that the page data needs to be acquired when there is any page data not yet stored after confirming whether the determined page data is already stored in the page data cache area 19.

Further, when it is determined that the continuous operation has been performed, it is considered that the page that the user desires to browse is a page for which the page feeding operation has been finally performed at the continuous operation termination timing. Hence, by not making a page download request in the middle while it is determined that a continuous operation is being performed, it becomes possible to reduce the traffic load in communications with the web server 2 (reduce the amount of communications) regarding processing for requesting the download of a page that is less likely to be browsed by the user. As a result, the processing load on the web server 2 and the user terminal 1 can also be reduced.

Further, by reducing unnecessary download request processing, the amount of page data to be recorded in the page data cache area 19 can be reduced. As a result, a free space can be secured in the page data cache area 19 and accordingly the limited storage region can be effectively used.

It can be said that the technique according to the present embodiment is particularly useful in the case of an e-book such as a magazine that is not necessarily read in the order of pages, since a continuous operation will be frequently used.

Further, when the transition destination page determined by the page feeding operation is already stored in the page data cache area 19, the transition destination page is displayed as a pap display screen on the display unit 71 without requesting the page data from the web server 2.

Accordingly, when the user performs a page feeding operation, the page can be displayed on the display region of the display unit 71 by acquiring page data from the page data cache area 19, without waiting for the reception of page data from the web server 2. Therefore, the user can reduce the waiting time for downloading at the time of a page feeding operation and can read an e-book comfortably.

Further, storing page data in the page data cache area 19 every time the page data is acquired from the web server 2 can eliminate the necessity of requesting, the page data again from the web server 2 even when the page feeding operation is performed again for a page having been once requested. Therefore, the amount of communications with the web server 2 can be reduced.

Further, in the user terminal 1, it is considered that the page request unit 12 specifies the display target page and the neighboring page of the display target page as the first storage target page data or the second storage target page data (steps S502, S515, and S508 in FIG. 12).

That is, the page request unit 12 specifies the page adjacent to the currently displayed page as the display target page, among the first storage target page data, and specifies the page in the predetermined range including the adjacent page of the specified display target page as the neighboring page. Further, the page request unit 12 specifies the display target page according to the continuous operation among the second storage target page data, and specifies the page in the predetermined range including the adjacent page of the specified display target page as the neighboring page.

As a result, the page request unit 12 requests page data for the neighboring page that the user is likely to browse in the future by the page feeding operation in addition to the display target page to be displayed on the display unit 71.

In this manner, determining the page to be requested with reference to the target page indicated by the continuous operation can streamline and optimize the cache content of the user terminal. That is, it is possible to appropriately store a peripheral area around the currently browsed page that is likely to be browsed by the user.

In addition, when a one-shot operation is detected, the next page can be immediately displayed since peripheral pages (neighboring pages) of the display target page are already downloaded.

Further, in the user terminal 1, the page request unit 12 performs the page data request processing, when necessary, so that at least pages continuous in the page advancing direction from the display target page (forward neighboring pages) are stored, as neighboring pages, in the storage region (the page data cache area 19) (steps S508 and S512 in FIG. 12).

That is, forward neighboring pages neighboring in the page advancing direction when viewed from the display target page are stored in the storage region.

When the user continues to read an e-book, it can be said that pages in the page advancing direction from the page currently displayed on the display unit 71 are likely to be browsed by the user in the future. Therefore, storing the page data of such pages that will be possibly browsed in advance in the page data cache area 19 enables the user to comfortably continue to read the e-book. That is, user convenience can be improved.

Further, in the user terminal 1, the page request unit 12 performs the page data request processing, when necessary, so that at least pages continuous in the page retrogressing direction from the display target page (backward neighboring pages) are stored, as neighboring pages, in the storage region (the page data cache area 19).

That is, backward neighboring pages neighboring in the page retrogressing direction when viewed from the display target page are stored in the storage region.

When the user performs a continuous operation for page transition of an e-book, the user may return the page backward so that a desired page can be opened after transition. In such a case, storing the page data in advance in the page data cache area 19 enables the user to comfortably continue to read the e-book. That is, user convenience can be improved.

Further, in this embodiment, the forward neighboring pages are pages in the page advancing direction of the e-book. Therefore, it can be said that the forward neighboring pages are likely to be browsed in the future. On the other hand, the backward neighboring pages in the page retrogressing direction are not necessarily browsed.

Figure 17:
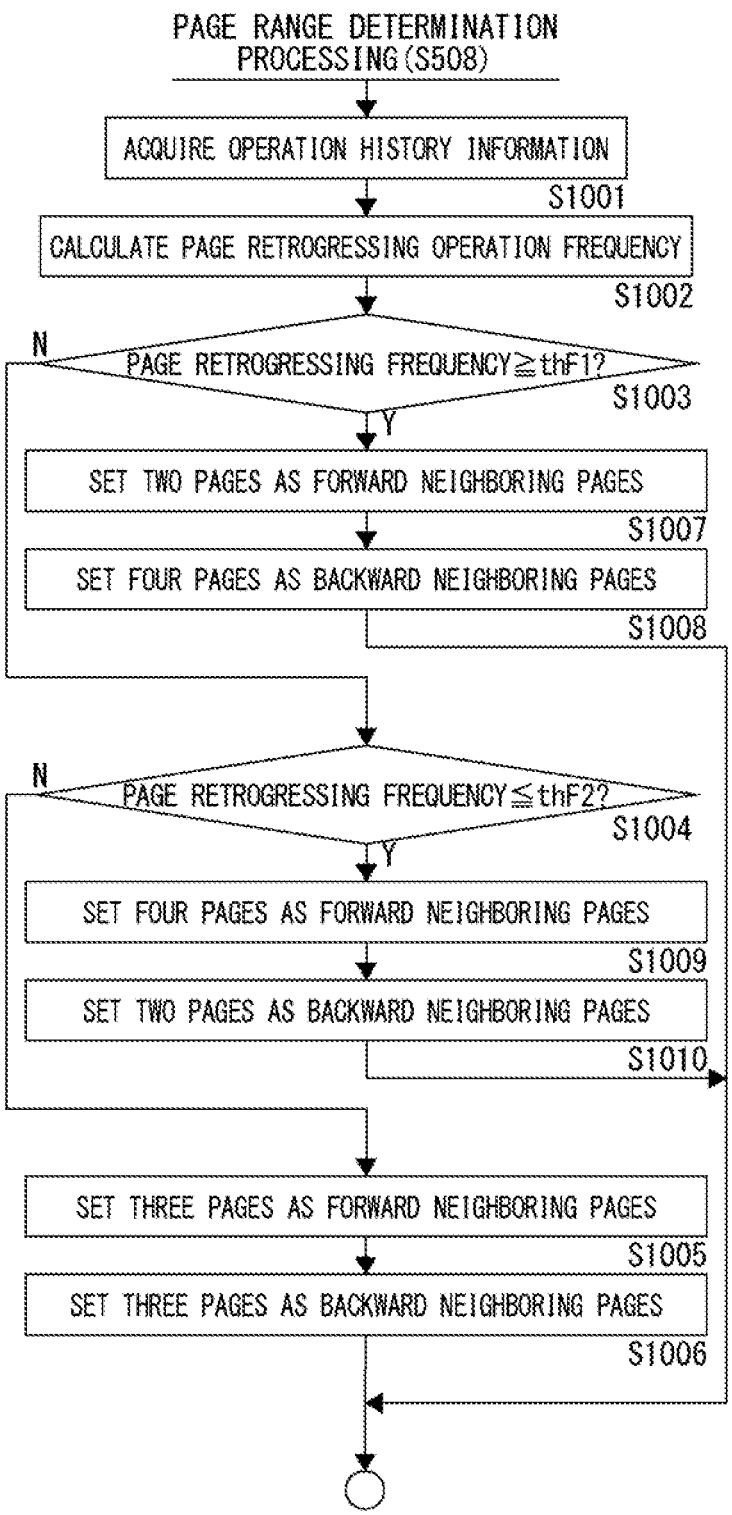
FIG. 17 is an explanatory diagram illustrating page range determination processing according to a fifth embodiment.

Therefore, it is conceivable to set the range of neighboring pages to be requested so that the number of the backward neighboring pages is smaller than that of the forward neighboring pages (step S1009 in FIG. 17).

Thus, in order to prevent the page data cache area 19 of the information processing device from being suppressed, the page data of the backward neighboring pages to be requested is set to be smaller. On the other hand, the number of the forward neighboring pages that will be possibly read by the user is set to be larger. Accordingly, it becomes possible to secure the storage region while securing comfortable operability for the user. As a result, the page data cache area 19 (the storage region) can be more efficiently used.

Figure 13:
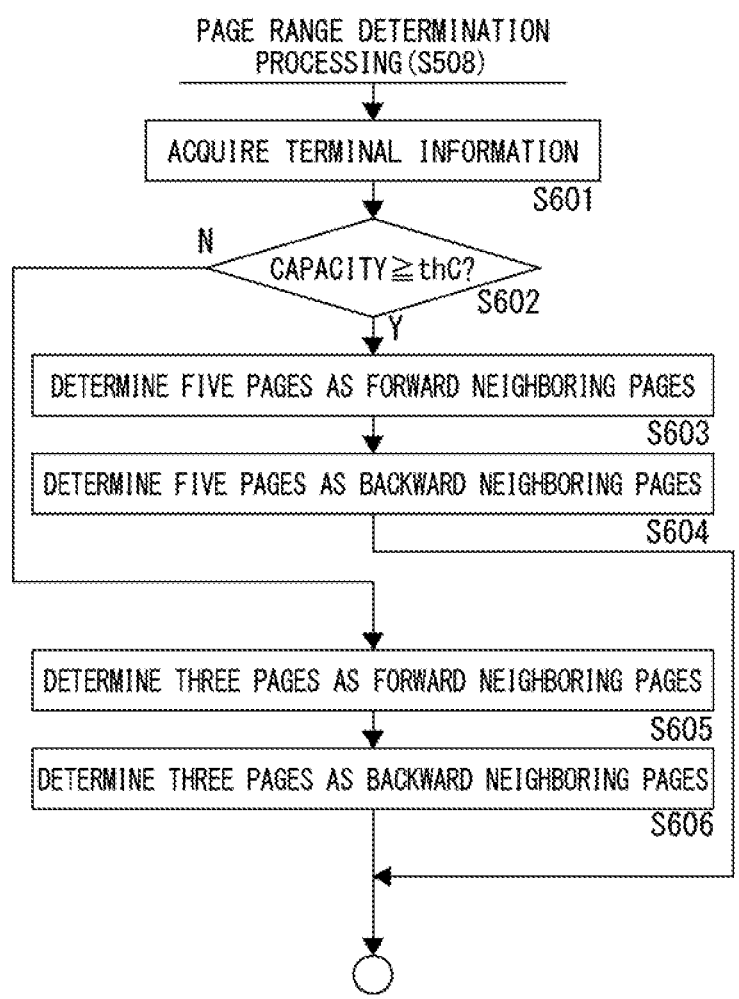
FIG. 13 is an explanatory diagram illustrating page range determination processing according to a second embodiment.

Further, in the user terminal 1, the page request unit 12 sets, according to the capacity of the storage region, the number of forward neighboring pages and the number of backward neighboring pages to be requested (FIG. 13).

That is, the number of forward neighboring pages and the number of backward neighboring pages are set so as to prevent the storage region of the information processing device from being suppressed.

Thus, if there is enough storage capacity, the displayable range can be expanded regardless of the downloading by expanding the storable range. As a result, the range in which pages can be quickly displayed can be expanded, and it becomes possible to flexibly respond to user's page feeding operation.

Further, in the case of a device having insufficient storage capacity, the storage load can be reduced.

Figure 14:
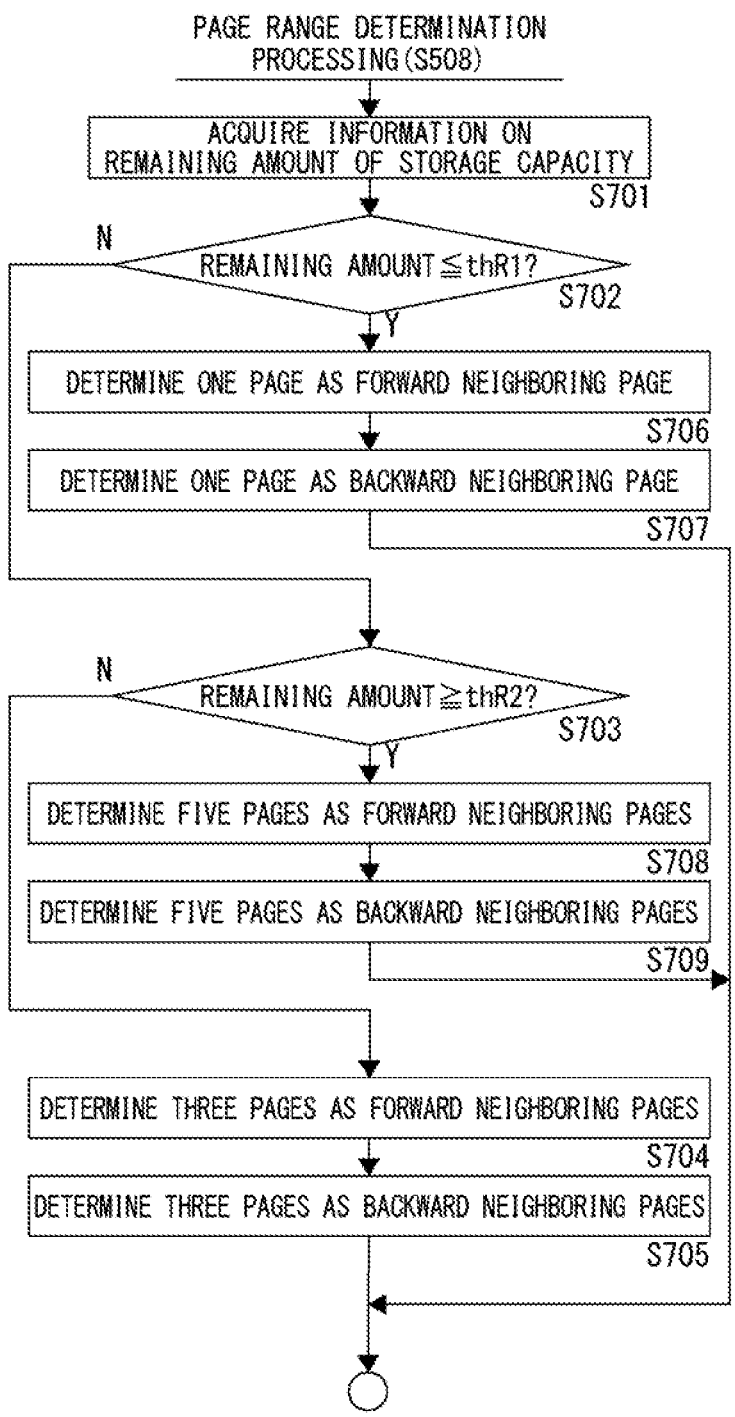
FIG. 14 is an explanatory diagram illustrating page range determination processing according to a third embodiment.

Further, in the user terminal 1, the page request unit 12 sets, according to the remaining amount of the storage region (the page data cache area 19), the number of forward neighboring pages and the number of backward neighboring pages to be requested (FIG. 14).

That is, the number of forward neighboring pages and the number of backward neighboring pages are set so that the storage region usable for another purpose of the information processing device can be secured.

Thus, the user can operate the user terminal 1 comfortably without worrying about the remaining storage amount (the page data cache area 19).

Figure 16:
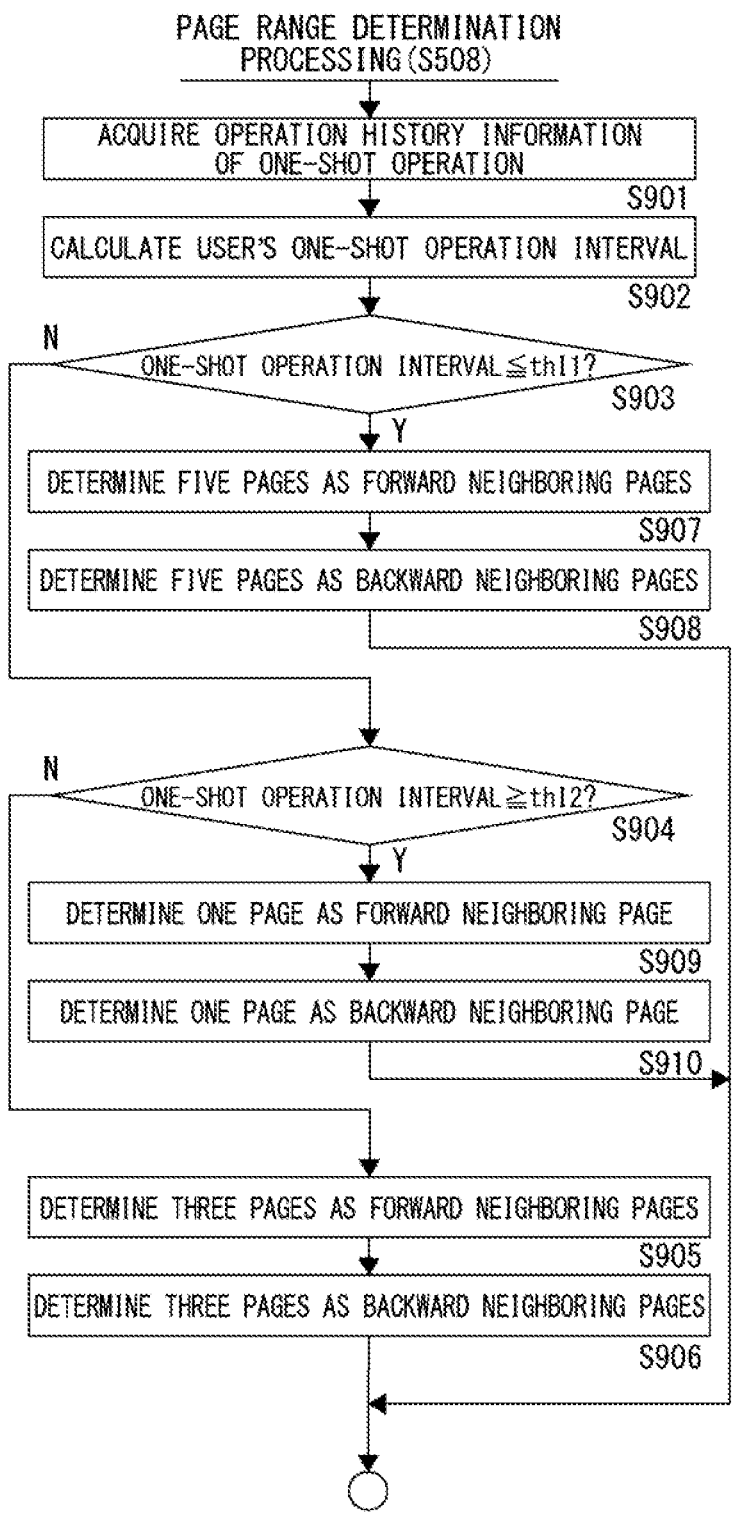
FIG. 16 is an explanatory diagram illustrating page range determination processing according to a fourth embodiment.

Further, in the user terminal 1, the page request unit 12 sets forward neighboring pages based on the operation history of the user (operation history information storage area 18) (FIG. 16).

That is, the operation tendency is determined from the operation history of the user, and the number of neighboring pages is changed according to the tendency of each user.

This reduces the occasions of requesting the page data that is less likely to be browsed by the user, and accordingly reduces the amount of communications with the web server 2. Further, the securable storage region increases by the amount of page data not requested.

Further, in the user terminal 1, the page request unit 12 sets the neighboring page to be requested according to the time interval between one-shot operations (FIG. 16).

That is, the user's page turning speed is estimated from the interval of one-shot operations, and the number of forward neighboring pages and the number of backward neighboring pages are changed according to the user's page turning speed.

For example, in the case of a person who performs one-shot operations at short intervals (a person who reads quickly), both the number of forward neighboring pages and the number of backward neighboring pages are set to be larger values. This prevents the page feeding operation, when performed by the user, from being delayed. Therefore, quick page display can be realized and user convenience can be improved.

Further, in the case of a person who performs one-shot operations at long intervals (a person who reads slowly), both the number of forward neighboring pages and the number of backward neighboring pages are set to be smaller values. This reduces the storage load on the storage region while securing user convenience.

Figure 18A:
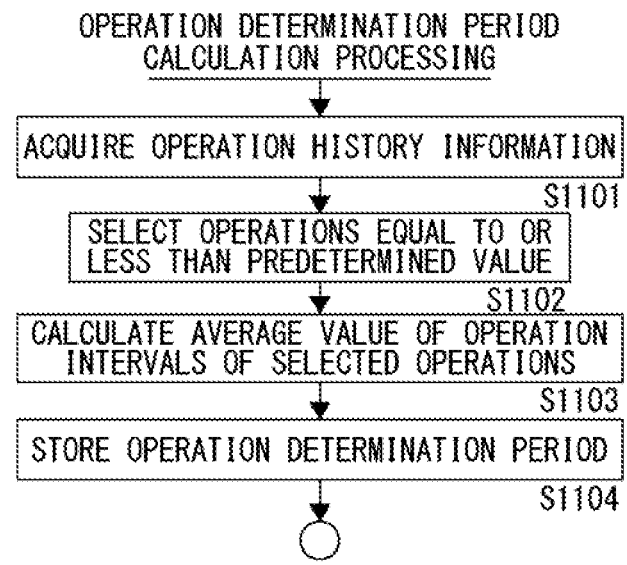
FIGS. 18A and 18B are explanatory diagrams illustrating operation determination period calculation processing according to a sixth embodiment and a seventh embodiment.

Further, in the user terminal 1, the operation type determination unit 11 sets the predetermined period (the operation determination period t) based on the operation history of the user (FIG. 18A).

That is, the tendency of the user's operation is determined from the operation history, and the criterion for determining the one-shot operation and the continuous operation is changed for each user. This makes it possible to set the operation determination period t according to the characteristics of each user with respect to the speed at which the pages of the e-book are read, and user convenience can be improved.

Further, in the user terminal 1, the operation type determination unit 11 sets the predetermined period (the operation determination period t) based on the operation history of the user in currently displayed content (e-book) (FIG. 18A).

As a result, the tendency of the user's operation is grasped for each content, and the criterion for determining the one-shot operation and the continuous operation is changed for each content.

Even if the reader is the same, the interval between page feeding operations is completely different, for example, between a magazine with a smaller number of sentences and a paperback book with a larger number of characters. The above setting makes it possible to perform the page feeding operation according to the characteristics of each user while considering the content type, and therefore user convenience can be improved.

Figure 18B:
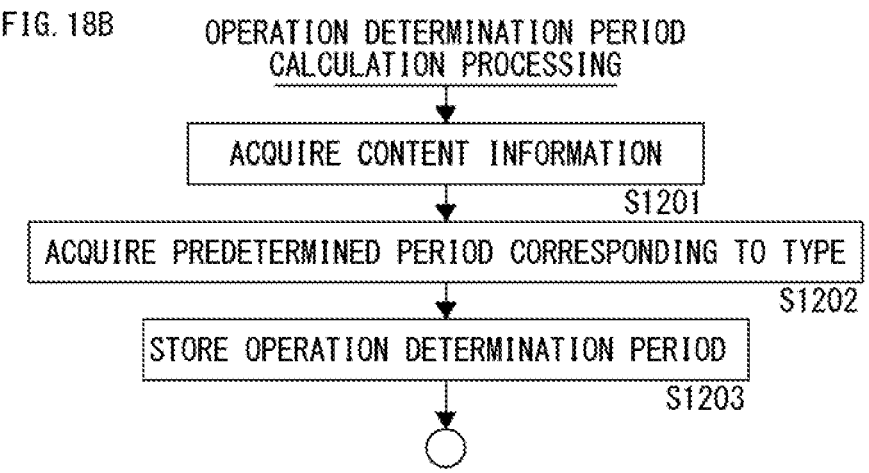

Further, in the user terminal 1, the operation type determination unit 11 sets the predetermined period (the operation determination period t) based on the type information of the currently displayed content (e-book) (FIG. 18B).

As a result, the criterion for determining the one-shot operation and the continuous operation is changed for each content being browsed by the user.

As mentioned above, the interval between page feeding operations often changes greatly depending on the type of each e-book, such as "comic" or "paperback". The above setting, makes it possible to perform the page feeding operation according to the genre of the content, and therefore user convenience can be improved.

Further, in the user terminal 1, the storage management unit 13 deletes the whole or a part of the page data not falling under the predetermined range including adjacent pages of the currently displayed page, among the page data stored in the storage region (the page data cache area 19) (step S510 in FIG. 12).

That is, the page data not tithing under the predetermined range including adjacent page of the currently displayed page is deleted as needed, and a free space is secured in the page data cache area 19.

Storing page data in the page data cache area 19 every time the page data is acquired from the web server 2 is convenient in that the necessity of newly requesting the page data from the web server 2 can be eliminated and the amount of communications can be reduced. However, continuing to store the page data in this manner will suppress the storage capacity of the page data cache area 19 and storing page data when distributed from the web server 2 may become difficult.

Hence, occasionally deleting some page data other than the acquired page data can secure a free space of the storage capacity of the page data cache area 19, and the free space can be effectively used.

Figure 19A:
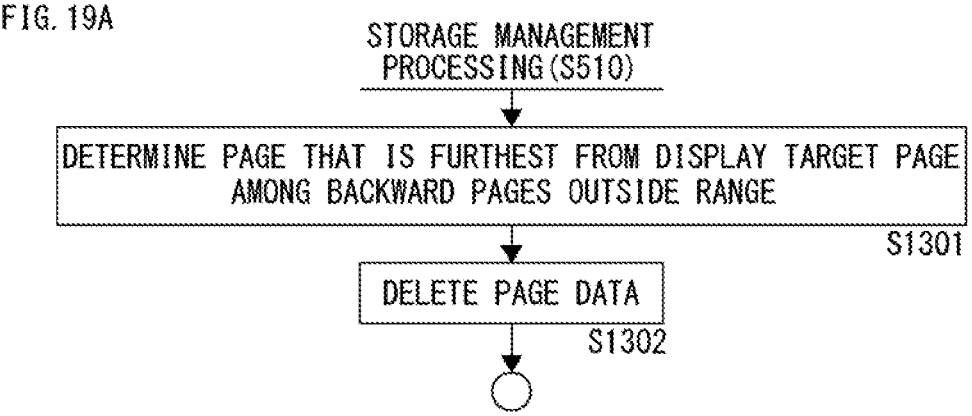
FIGS. 19A and 19B are explanatory diagrams illustrating storage management processing according to an eighth embodiment and a ninth embodiment.
Figure 19B:
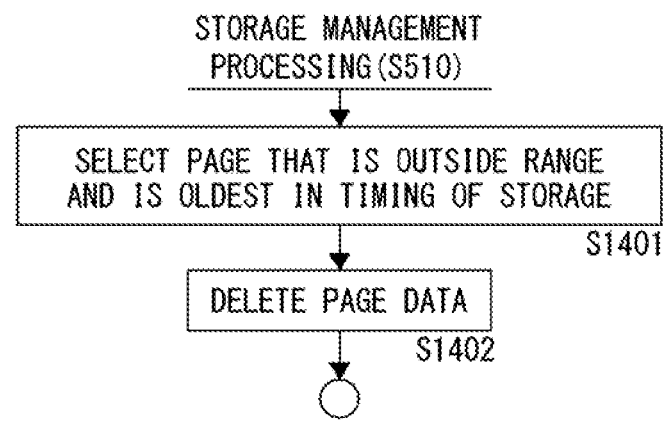

Further, in the user terminal 1, the storage management unit 13 deletes the page data other than the acquired page data and oldest in timing of storage among the page data stored in the storage region (the page data cache area 19) (FIG. 19B).

As a result, the page data that is less likely to be browsed by the user in the future is deleted.

Therefore, the storage load on the storage region can be reduced without affecting the operability of the user, and the storage region can be more effectively used.

Figure 15:
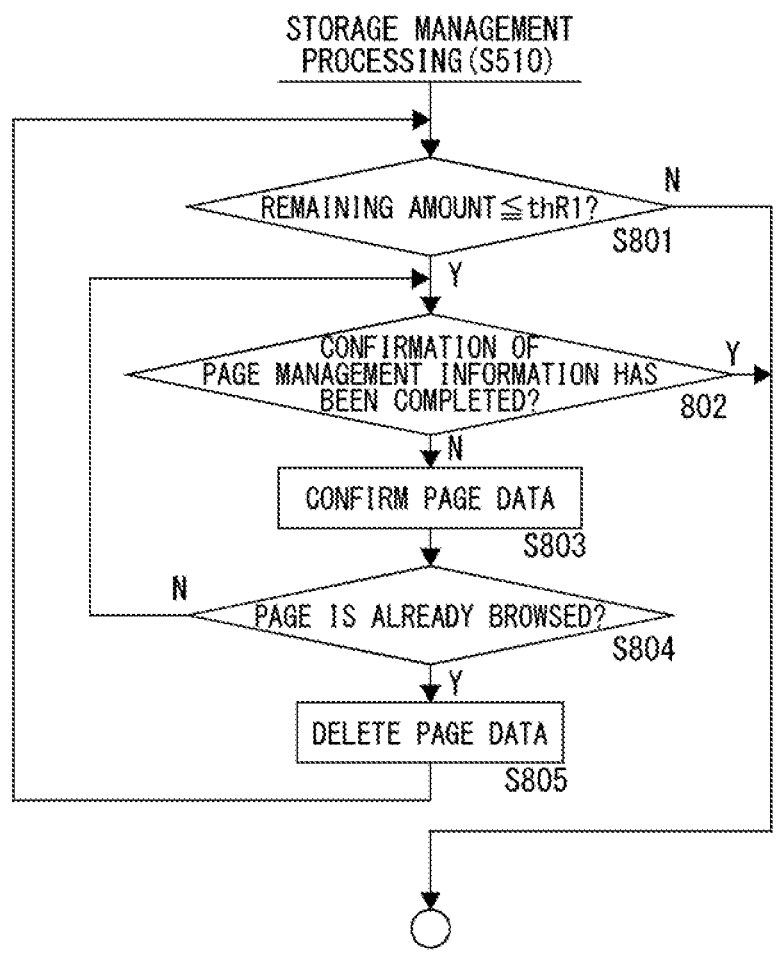
FIG. 15 is an explanatory diagram illustrating storage management processing according to the third embodiment.

Further, in the user terminal 1, the storage management unit 13 deletes the page data that is outside the predetermined range and has been a display target at least once among the page data stored in the storage region (the page data cache area 19) (FIG. 15).

That is, since the page having been browsed at least once by the user is unlikely to be browsed by the user, the page data is deleted.

Therefore, the storage load on the storage region can be reduced without impairing the operability of the user, and the storage region can be more effectively used.

Further, in the user terminal 1, the storage management unit 13 deletes the page data furthest from the display target page among backward neighboring pages other than the acquired page data stored in the storage region (FIG. 19A).

That is, the page feeding operation the retrogressing direction from the display target page being displayed is not so frequently performed. This is even more so in the case of a backward neighboring page that is furthest from the display target page. Therefore, this backward neighboring page is deleted.

As a result, the storage load on the storage region can be reduced without impairing the operability of the user, and the storage region can he more effectively used.

Further, in the user terminal 1, the distribution of the page data not stored in the storage region among the page data of the predetermined range is requested to the external device (the web server 2 (steps S511 and S512 in FIG. 12).

That is, the page data that is not stored in the storage region is determined as the page data to be requested. This eliminates the necessity of communicating with the web server 2 again for the page stored in the storage region, and therefore the amount of communications can be further reduced.

Further, in the user terminal 1, the display control unit 14, when detecting a page feeding operation, displays the page (FIG. 8B) obtainable by simplifying the page constituting the currently displayed content, as the page transition screen showing the state of page transition (step S410 in FIG. 11).

As a result, the requested page data is acquired, and the page transition screen is displayed until the page data is displayed on the display device.

Accordingly, since the screen changes immediately in response to a page feeding operation, the comfortable operational feeling can be realized without making the user feel the delay in response due to the time for determining the operation or for the downloading.

In addition, displaying a page transition screen according to the genre of each e-book being currently browsed, for example, in the case of a comic magazine, displaying a frame layout similar to the comic magazine, can give realistic and natural page turning feeling to the user.

Further, if there is a downloaded page during the page transition, such a page can be displayed as a page transition screen. As a result, more realistic and natural page turning feeling can be given to the user.

Further, each of the first through ninth embodiments described as the present embodiments may be implemented as independent processed or as combined processing.

For example, executing the storage management processing in the eighth embodiment and the storage management processing in the ninth embodiment in parallel can secure a larger free storage region.

Regarding the combination of embodiments, various modes other than the above example can be considered.

13. Program and Storage Medium

Although the user terminal 1 has been described above as an embodiment of the information processing device according to the present embodiment, the program according to the embodiment is a program that causes an information processing device (such as a CPU) to execute each processing in the user terminal 1.

The program according to the embodiment is a program for causing an information processing device, which requests only page data in a predetermined range including a page designated by a user's page feeding operation for each page feeding operation, to execute functions of detecting a user's page feeding operation on content containing a plurality of pages, determining a plurality of page feeding operations as a continuous operation if the page feeding operation has been performed again within a predetermined period from the page feeding operation, and determining a page feeding operation not falling under the continuous operation as a one-shot operation, specifying first storage target page data to be stored in a storage region according to the one-shot operation when a determination of the one-shot operation is made, making a distribution request for page data not stored in the storage region among the specified first storage target page data, specifying second storage target page data to be stored in the storage region according to a termination determination of the continuous operation when a determination of the continuous operation is made, and making a distribution request for page data not stored in the storage region among the specified second storage target page data, storing page data distributed according to the distribution request in the storage region, and performing control for reading out page data from the storage region and displaying the readout page data in response to a user's page feeding operation.

That is, this program is a program causing the user terminal 1 to execute the processing in each step described with reference to FIGS. 10 through 19B.

With such a program, the information processing device as the user terminal 1 described above can be realized.

Further, the program can be stored in advance in a HDD serving as a storage medium built in a device such as a computer device or in a ROM in a microcomputer having a CPU. Farther, the program can be recorded (stored) temporarily or permanently in a removable storage medium such as a semiconductor memory, a memory card, an optical disk, a magneto-optical disk, or a magnetic disk. Further, such a removable storage medium can be provided as so-called packaged software.

Further, such a program can be installed on a personal computer or the like from a removable storage medium, and can be downloaded from a download site via a network such as a LAN or the Internet.

In the present embodiment, the processing that the user terminal 1 executes has been described as exemplary processing. However, the present embodiment is not limited to the processing by the user terminal 1, and the web server 2 may perform similar processing.

Further, the above program can be realized as application software that can be provided to PCs, smartphones, and the like.

REFERENCE SIGNS LIST

N . . . network, 1 . . . user terminal, 2 . . . web server, 3 . . . database, 11 . . . operation type determination unit, 12 . . . page request unit, 13 . . . storage management unit, 14 . . . display control unit

The invention claimed is:

1. An information processing device that requests only page data in a predetermined range including a page designated by a user's page feeding operation for each page feeding operation, comprising:
   at least one memory configured to store computer program code;
   at least one processor configured to access the computer program code and operate as instructed by the computer program code, the computer program code including:
   operation type determination code configured to cause at least one of the at least one processor to detect a user's page feeding operation on content containing a plurality of pages, determine a plurality of page feeding operations as a continuous operation if the page feeding operation has been performed again within a predetermined period from the page feeding operation, and determine a page feeding operation not falling under the continuous operation as a one-shot operation;
   page request code configured to cause at least one of the at least one processor to:
      specify first storage target page data to be stored in a storage region according to the one-shot operation when a determination of the one-shot operation is made, make a first distribution request for page data not stored in the storage region among the specified first storage target page data, and
      specify second storage target page data to be stored in the storage region according to a termination determination of the continuous operation when a determination of the continuous operation is made, and make a second distribution request for page data not stored in the storage region among the specified second storage target page data, wherein the second storage target page data is specified based on a number of the continuous operation and a page that has been displayed prior to the continuous operation;
   storage management code configured to cause at least one of the at least one processor to:
      store page data distributed according to the first distribution request or the second distribution request in the storage region, and
      delete a whole or a part of page data not falling under the predetermined range including an adjacent page of a currently displayed page and is furthest in a page retrogressing direction from page data serving as a display target among the page data stored in the storage region; and display control code configured to cause at least one of the at least one processor to perform control for reading out page data from the storage region and displaying the read out page data in response to a user's page feeding operation.

2. The information processing device according to claim 1, wherein
the page request code is configured to cause at least one of the at least one processor to not make the second distribution request for the page data in response to the user's page feeding operation in a period during which the operation type determination code causes at least one of the at least one processor to determine that the continuous operation is being performed.

3. The information processing device according to claim 1, wherein
the page request code is configured to cause at least one of the at least one processor to specify both a display target page and a neighboring page of the display target page as the first storage target page data or the second storage target page data.

4. The information processing device according to claim 3, wherein
the page request code is configured to cause at least one of the at least one processor to specify, as the display target page, an adjacent page of a currently displayed page among the first storage target page data, and specify a page in a second predetermined range including an adjacent page of the specified display target page as the neighboring page,
and further specify the display target page according to the continuous operation among the second storage target page data, and specify a page in a third predetermined range including the adjacent page of the specified display target page as the neighboring page.

5. The information processing device according to claim 3, wherein
the page request code is configured to cause at least one of the at least one processor to specify, as the neighboring page, at least a page continuous in a page advancing direction from the display target page.

6. The information processing device according to claim 3, wherein
neighboring pages are specified so that pages continuous in a page retrogressing direction from the display target page are less than pages continuous in a page advancing direction from the display target page.

7. The information processing device according to claim 3, wherein
the page request code is configured to cause at least one of the at least one processor to specify the neighboring page according to a capacity of the storage region.

8. The information processing device according to claim 3, wherein
the page request code is configured to cause at least one of the at least one processor to specify the neighboring page according to a remaining amount of the storage region.

9. The information processing device according to claim 3, wherein
the page request code is configured to cause at least one of the at least one processor to specify the neighboring page based on an operation history of the user.

10. The information processing device according to claim 3, wherein
the page request code is configured to cause at least one of the at least one processor to specify the neighboring page according to a time interval between one-shot operations.

11. The information processing device according to claim 1, wherein
the operation type determination code is configured to cause at least one of the at least one processor to set the predetermined period based on an operation history of the user.

12. The information processing device according to claim 11, wherein
the operation type determination code is configured to cause at least one of the at least one processor to set the predetermined period based on the operation history of the user in currently displayed content.

13. The information processing device according to claim 11, wherein
the operation type determination code is configured to cause at least one of the at least one processor to set the predetermined period based on an information type of currently displayed content.

14. The information processing device according to claim 1, wherein
the storage management code is configured to cause at least one of the at least one processor to delete page data that does not fall under the predetermined range including the adjacent page of the currently displayed page and is oldest in timing of storage, among the page data stored in the storage region.

15. The information processing device according to claim 1, wherein
the storage management code is configured to cause at least one of the at least one processor to delete page data that does not fall under the predetermined range including the adjacent page of the currently displayed page and has been a display target at least once, among the page data stored in the storage region.

16. The information processing device according to claim 1, wherein
the display control code is configured to cause at least one of the at least one processor, when detecting a page feeding operation, to display a reduced-content page related to a page constituting currently displayed content, as a page transition screen showing a state of page transition.

17. An information processing method that is executed by at least one processor in an information processing device that requests only page data in a predetermined range including a page designated by a user's page feeding operation for each page feeding operation, comprising:
detecting a user's page feeding operation on content containing a plurality of pages, determining a plurality of page feeding operations as a continuous operation if the page feeding operation has been performed again within a predetermined period from the page feeding operation, and determining a page feeding operation not falling under the continuous operation as a one-shot operation;
specifying first storage target page data to be stored in a storage region according to the one-shot operation when a determination of the one-shot operation is made, making a first distribution request for page data not stored in the storage region among the specified first storage target page data;

specifying second storage target page data to be stored in the storage region according to a termination determination of the continuous operation when a determination of the continuous operation is made, and making a second distribution request for page data not stored in the storage region among the specified second storage target page data, wherein the second storage target page data is specified based on a number of the continuous operation and a page that has been displayed prior to the continuous operation;

storing page data distributed according to the first distribution request or the second distribution request in the storage region;

deleting a whole or a part of page data not falling under the predetermined range including an adjacent page of a currently displayed page and is furthest in a page retrogressing direction from page data serving as a display target among the page data stored in the storage region; and performing control for reading out page data from the storage region and displaying the read out page data in response to a user's page feeding operation.

18. A non-transitory computer-readable storage medium storing a program for causing an information processing device, which requests only page data in a predetermined range including a page designated by a user's page feeding operation for each page feeding operation, to:

detect a user's page feeding operation on content containing a plurality of pages, determine a plurality of page feeding operations as a continuous operation if the page feeding operation has been performed again within a predetermined period from the page feeding operation, and determine a page feeding operation not falling under the continuous operation as a one-shot operation;

specify first storage target page data to be stored in a storage region according to the one-shot operation when a determination of the one-shot operation is made, make a first distribution request for page data not stored in the storage region among the specified first storage target page data, specify second storage target page data to be stored in the storage region according to a termination determination of the continuous operation when a determination of the continuous operation is made, and make a second distribution request for page data not stored in the storage region among the specified second storage target page data, wherein the second storage target page data is specified based on a number of the continuous operation and a page that has been displayed prior to the continuous operation;

store page data distributed according to the first distribution request or the second distribution request in the storage region;

delete a whole or a part of page data not falling under the predetermined range including an adjacent page of a currently displayed page and is furthest in a page retrogressing direction from page data serving as a display target among the page data stored in the storage region; and perform control for reading out page data from the storage region and displaying the readout page data in response to a user's page feeding operation.

\* \* \* \* \*